United States Patent
Onaka

(10) Patent No.: US 10,056,979 B2
(45) Date of Patent: Aug. 21, 2018

(54) OPTICAL TRANSMISSION DEVICE AND OPTICAL COMMUNICATION SYSTEM

(71) Applicant: FUJITSU LIMITED, Kawasaki-shi, Kanagawa (JP)

(72) Inventor: Miki Onaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/689,690

(22) Filed: Aug. 29, 2017

(65) Prior Publication Data
US 2018/0069633 A1 Mar. 8, 2018

(30) Foreign Application Priority Data
Sep. 7, 2016 (JP) ................... 2016-174803

(51) Int. Cl.
| H04B 10/06 | (2006.01) |
|---|---|
| H04B 10/02 | (2006.01) |
| H04B 10/00 | (2013.01) |
| H04B 10/43 | (2013.01) |
| H04B 10/564 | (2013.01) |
| H04B 10/67 | (2013.01) |

(52) U.S. Cl.
CPC ........... *H04B 10/43* (2013.01); *H04B 10/564* (2013.01); *H04B 10/672* (2013.01)

(58) Field of Classification Search
CPC ..... H04B 10/43; H04B 10/564; H04B 10/672
USPC .................................................. 398/162, 138
See application file for complete search history.

(56) References Cited

U.S. PATENT DOCUMENTS

| 5,301,053 | A * | 4/1994 | Shikada | ................. | H04B 10/60 |
|---|---|---|---|---|---|
| | | | | | 398/204 |
| 7,209,664 | B1 * | 4/2007 | McNicol | ................ | H04B 10/50 |
| | | | | | 375/219 |
| 7,756,421 | B2 * | 7/2010 | Roberts | ............. | H04B 10/2543 |
| | | | | | 398/158 |
| 2011/0188866 | A1 * | 8/2011 | Maeda | ......................... | 398/162 |

(Continued)

FOREIGN PATENT DOCUMENTS

| JP | 2004-29341 | 1/2004 |
|---|---|---|
| JP | 2013-145942 | 7/2013 |

(Continued)

*Primary Examiner* — Oommen Jacob
(74) *Attorney, Agent, or Firm* — Staas & Halsey LLP

(57) ABSTRACT

An optical transmission device as the first optical transmission device includes a light source to output light, an optical transmitter to transmit first information regarding a reception characteristic and power consumption of the first optical transmission device to a second transmission device, an optical receiver to receive second information regarding a reception characteristic and power consumption of the second optical transmission device, an optical branching circuit to branch the light output from the light source into transmission light for the optical transmitter and local light for coherent reception by the optical receiver, and vary power of the transmission light and power of the local light individually, and a processor to control a driving condition of the optical branching circuit, based on the first information and the second information, the power of the transmission light and the power of the local light varying in accordance with the driving condition.

15 Claims, 18 Drawing Sheets

(56) References Cited

U.S. PATENT DOCUMENTS

| | | | |
|---|---|---|---|
| 2013/0129348 A1* | 5/2013 | Mak | H04B 10/07953 398/26 |
| 2015/0311976 A1* | 10/2015 | Ishizaka | H04B 10/2503 398/38 |
| 2016/0103286 A1 | 4/2016 | Matsui | |
| 2016/0254862 A1* | 9/2016 | Hayashi | H04B 10/07953 398/27 |
| 2016/0261346 A1* | 9/2016 | Li | H04B 10/532 |
| 2017/0230337 A1* | 8/2017 | Akhavain Mohammadi | H04L 63/04 |
| 2017/0302384 A1* | 10/2017 | Tsurumi | H04B 10/572 |
| 2018/0069633 A1* | 3/2018 | Onaka | H04B 10/43 |
| 2018/0138980 A1* | 5/2018 | Jiang et al. | H04B 10/40 |

FOREIGN PATENT DOCUMENTS

| | | |
|---|---|---|
| JP | 2014-236420 | 12/2014 |
| JP | 2015-167174 | 9/2015 |
| JP | 2015-170916 | 9/2015 |
| JP | 2016-82590 | 5/2016 |

\* cited by examiner

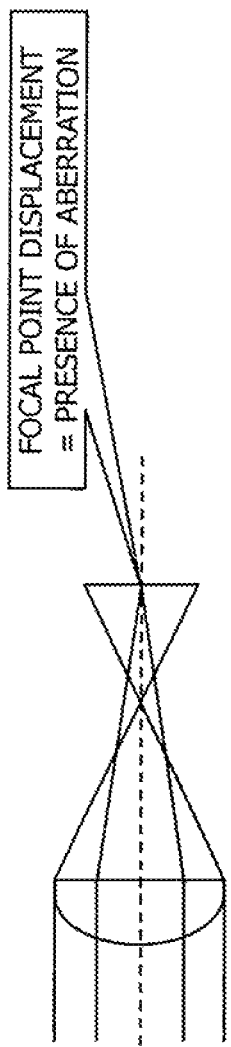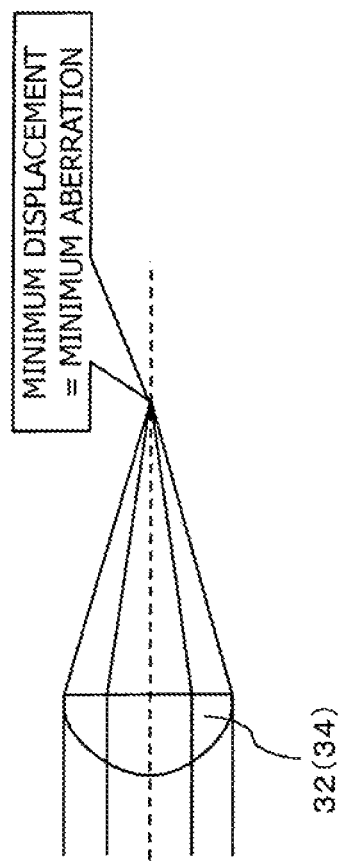

FIG. 14A

DRIVING CURRENT VERSUS RECEPTION CHARACTERISTIC INFORMATION (A-STATION)

| B-STATION TRANSMISSION LIGHT DRIVING CURRENT | A-STATION LO LIGHT DRIVING CURRENT | | | |
|---|---|---|---|---|
| | $Y_1$ | $Y_2$ | $Y_3$ | $Y_4$ |
| $X_1$ | $Z1_A$ | $Z5_A$ | $Z9_A$ | $Z13_A$ |
| $X_2$ | $Z2_A$ | $Z6_A$ | $Z10_A$ | $Z14_A$ |
| $X_3$ | $Z3_A$ | $Z7_A$ | $Z11_A$ | $Z15_A$ |
| $X_4$ | $Z4_A$ | $Z8_A$ | $Z12_A$ | $Z16_A$ |

FIG. 14B

DRIVING CURRENT VERSUS RECEPTION CHARACTERISTIC INFORMATION (B-STATION)

| A-STATION TRANSMISSION LIGHT DRIVING CURRENT | B-STATION LO LIGHT DRIVING CURRENT | | | |
|---|---|---|---|---|
| | $Y_1$ | $Y_2$ | $Y_3$ | $Y_4$ |
| $X_1$ | $Z1_B$ | $Z5_B$ | $Z9_B$ | $Z13_B$ |
| $X_2$ | $Z2_B$ | $Z6_B$ | $Z10_B$ | $Z14_B$ |
| $X_3$ | $Z3_B$ | $Z7_B$ | $Z11_B$ | $Z15_B$ |
| $X_4$ | $Z4_B$ | $Z8_B$ | $Z12_B$ | $Z16_B$ |

OPTICAL TRANSMISSION DEVICE AND OPTICAL COMMUNICATION SYSTEM

CROSS-REFERENCE TO RELATED APPLICATION

This application is based upon and claims the benefit of priority of the prior Japanese Patent Application No. 2016-174803, filed on Sep. 7, 2016, the entire contents of which are incorporated herein by reference.

FIELD

The embodiment discussed herein is related to an optical transmission device and an optical communication system.

BACKGROUND

In an optical transmission device (that may be referred to as an optical transmission station) of an optical communication system, one light source may be shared between an optical transmitter and an optical receiver. The optical transmission device may, for example, include an optical branching circuit that branches the output light of the light source into transmission light for the optical transmitter and local light for the optical receiver.

Related techniques are disclosed in, for example, Japanese Laid-open Patent Publication Nos. 2015-170916, 2013-145942, 2015-167174, 2016-082590, 2014-236420 and 2004-029341.

SUMMARY

According to an aspect of the embodiment, an optical transmission device in an optical communication system in which a first optical transmission device and a second optical transmission device are capable of mutual bidirectional optical communication, the optical transmission device as the first optical transmission device includes a light source configured to output light, an optical transmitter configured to transmit first information regarding a reception characteristic and power consumption of the first optical transmission device to the second transmission device, an optical receiver configured to receive second information regarding a reception characteristic and power consumption of the second optical transmission device from the second transmission device, an optical branching circuit configured to branch the light output from the light source into transmission light for the optical transmitter and local light for coherent reception by the optical receiver, and vary power of the transmission light and power of the local light individually, a memory, and a processor coupled to the memory, the processor configured to control a driving condition of the optical branching circuit, based on the first information and the second information, the power of the transmission light and the power of the local light varying in accordance with the driving condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a schematic side view of a spherical lens, and FIG. 5B is a schematic side view of an aspherical lens;

FIG. 14A is a diagram illustrating an example of information stored by one optical transmission station illustrated in FIG. 10 and FIG. 12, and FIG. 14B is a diagram illustrating an example of information stored by the other optical transmission station illustrated in FIG. 10 and FIG. 12;

DESCRIPTION OF EMBODIMENT

Figure 1:
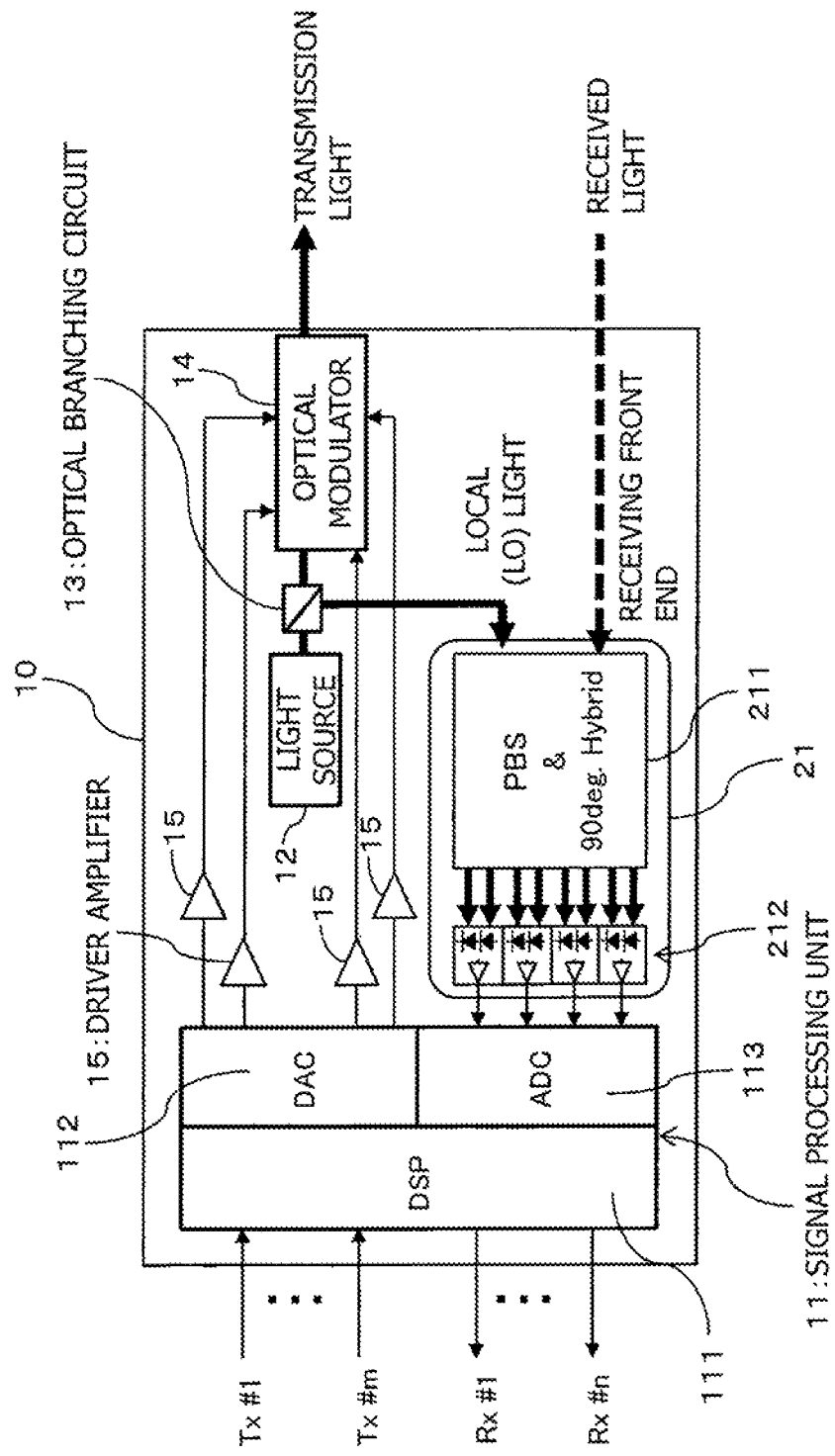
FIG. 1 is a block diagram illustrating an example of configuration of an optical transceiver according to one embodiment.

When the output light of the light source is branched by an optical branching circuit so that one light source is shared between the optical transmitter and the optical receiver, power required for transmission light and local light (LO light) may not be obtained, and thus power shortage may occur. When the power shortage occurs, the transmission distance of light may be limited. The power shortage may be resolved when the output optical power of the light source is increased. However, there is a limit to the output optical power of the light source.

For resolving the power shortage, amplifying the branched light by an optical amplifier, for example, is considered. However, for example, the driving current of the optical amplifier may be increased, and consequently power consumption may be increased.

Therefore, in a case where optical transmission devices each including a configuration in which a light source is shared between an optical transmitter and an optical receiver perform optical communication, even if the power of branched light is amplified such that the optical transmission devices mutually satisfy given reception characteristics, that may not be said to be appropriate from a viewpoint of power consumption.

In the following, with reference to the drawings, description will be made of an embodiment of a technology that optimizes reception characteristics and power consumption between optical transmission stations in an optical communication system formed with the optical transmission stations each including a configuration in which one light source is shared between an optical transmitter and an optical receiver. However, the embodiment to be described in the following is illustrative only, and is not intended to exclude the application of various modifications and technologies not explicitly illustrated in the following. In addition, various kinds of illustrative modes to be described in the following may be implemented in combination with each other as appropriate. Incidentally, in the drawings to be used in the following embodiment, parts identified by the same reference symbols represent the same or similar parts unless otherwise specified.

FIG. 1 is a block diagram illustrating an example of configuration of an optical transceiver according to one embodiment. The optical transceiver 10 illustrated in FIG. 1 may be a digital coherent optical transceiver compliant with CFP, CFP2, CFP4, or the like as an MSA standard.

"MSA" is an abbreviation of "Multi-Source Agreement," and is a common standard agreed upon between a plurality of vendors with regard to package size, pin arrangement, specifications, and the like of optical transceiver products. "CFP" is an abbreviation of "100G Form-factor Pluggable."

As illustrated in FIG. 1, the optical transceiver 10 may illustratively include a signal processing unit 11, a light source 12, an optical branching circuit 13, an optical modulator 14, driver amplifiers 15, and an optical receiver 21.

The signal processing unit 11 may perform transmission processing of one or more transmission signals Tx #1 to Tx #m and reception processing of one or more received signals Rx #1 to Rx #n. Incidentally, "m" and "n" are each an integer of 1 or more, and may be the same or may be different from each other.

Illustratively, the signal processing unit 11 may include a digital signal processor (DSP) 111, a digital-to-analog converter (DAC) 112, and an analog-to-digital converter (ADC) 113.

Directing attention to transmission processing of the DSP 111, the DSP 111 may illustratively generate, by digital signal processing, driving signals for the optical modulator 14, the driving signals corresponding to the transmission signals. In addition, directing attention to reception processing of the DSP 111, the DSP 111 may, by digital signal processing, numerically obtain and compensate for a factor in degradation of reception characteristics of received light transmitted through an optical transmission line.

An example of the factor in the degradation of the reception characteristics is chromatic dispersion (CD), polarization-mode dispersion (PMD), polarization dependent loss (PDL), nonlinear effect, or the like. The "reception characteristics" may be reworded as "transmission characteristics" or "reception quality." An example of an index of the "reception quality" is an optical signal to noise ratio (OSNR), an error rate, reception optical power, or the like.

Illustratively, the reception digital signal processing may include one or more of the following pieces of processing: dispersion compensation, sampling phase synchronization, adaptive equalization, frequency offset compensation, carrier phase recovery, and error correction decoding.

Incidentally, the digital signal processing is not limited to the DSP 111, but may be implemented by an arithmetic unit including an arithmetic capability. The arithmetic unit may be referred to also as a "hardware processor," a "processor device," or a "processor circuit." The arithmetic unit may be implemented by using a field programmable gate array (FPGA), a large-scale integrated circuit (LSI), or the like.

The DAC 112 illustratively converts the digital driving signals generated by the digital signal processing in the DSP 111 into analog driving signals. The analog driving signals may be input to the driver amplifiers 15 and amplified by the driver amplifiers 15.

The ADC 113 illustratively converts analog electric signals obtained according to the power of received light received by the optical receiver 21 into digital electric signals, and inputs the digital electric signals to the DSP 111. The DSP 111 may perform the foregoing reception digital signal processing based on the digital electric signals.

The light source 12 emits light of a certain wavelength. A semiconductor laser diode (LD) may illustratively be applied as the light source 12. The LD may be an LD having a fixed light emission wavelength, or may be a tunable LD having a variable light emission wavelength.

The optical branching circuit 13 illustratively branches the output light of the light source 12 into two pieces of light. One of the two branched pieces of light may be input as transmission light to the optical modulator 14. The other of the two branched pieces of light may be input as LO light to the optical receiver 21. The LO light may be used for coherent detection in the optical receiver 21.

For example, the light source 12 is shared for the transmission and reception processing of the optical transceiver 10, and serves to perform both functions of a transmission light source and a LO light source. Reductions in size, power consumption, and cost of the optical transceiver 10 may be achieved by sharing the light source 12 for the transmission and reception processing. Incidentally, an example of configuration of the optical branching circuit 13 will be described later with reference to FIG. 2.

The optical modulator 14 is illustratively driven by the driving signals including signal waveforms corresponding to the transmission signals, the driving signals being input from the driver amplifiers 15, and thereby modulates the branched light input from the optical branching circuit 13 based on the transmission signals.

A Mach-Zehnder (MZ) optical modulator may illustratively be applied as the optical modulator 14. Multi-level phase shift keying (PSK), multi-level quadrature amplitude modulation (QAM), or the like may be applied as a modulation format of the optical modulator 14.

In addition, a multiplexing format such as polarization multiplexing for one wavelength, or orthogonal frequency multiplexing (orthogonal frequency division multiplexing: OFDM) may be combined with the modulation format as appropriate. For example, a polarization multiplexing format in which a transmission signal is mapped onto each of different polarized waves (for example, an X-polarized wave and a Y-polarized wave) may be applied to the optical modulator 14.

In the polarization multiplexing format, a transmission signal may be mapped onto each of an in-phase (I-phase) component and a quadrature (Q-phase) component of each of the two different polarized waves. Thus, the optical modulator 14 may be provided with driving signals of four systems.

Hence, the driver amplifiers 15 may also be provided for the four systems (which may be referred to as "lanes"), as illustrated in FIG. 1. Incidentally, the "I-phase component" may be abbreviated to an "I-component," and the "Q-phase component" may be abbreviated as a "Q-component."

The optical receiver 21 is referred to also as a receiving front end. The optical receiver 21 may illustratively include a coherent detecting circuit 211 and a PD-TIA array 212. The "PD" is an abbreviation of a photodiode or a photodetector. The "TIA" is an abbreviation of a "transimpedance amplifier."

The coherent detecting circuit 211 illustratively mixes (mixing) the branched light input from the optical branching circuit 13 and the received light by a 90-degree hybrid mixer, for example, and thereby detects beat signals corresponding to light interference. The beat signals are electric field information of light corresponding to a reception desired wavelength, and may be expressed by a complex quantity. The reception desired wavelength corresponds to the wavelength of the branched light, for example, the oscillation wavelength of the light source 12.

In a case where the received light is a modulated signal in the polarization multiplexing format, the coherent detecting circuit 211 may be provided with a polarizing beam splitter (PBS) and 90-degree hybrid mixers for two respective polarized waves separated by the PBS.

Two different optical signals of an I-component and a Q-component of one of the two different polarized waves are obtained by one 90-degree hybrid mixer. Hence, optical signals of the four systems in total, for example, the I-component of the X-polarized wave (XI), the Q-component of the X-polarized wave (XQ), the I-component of the Y-polarized wave (YI), and the Q-component of the Y-polarized wave (YQ) are obtained by the two 90-degree hybrid mixers.

The PD-TIA array 212 converts each of the optical signals (XI, XQ, YI, and YQ) of the four systems, the optical signals being obtained by the two 90-degree hybrid mixers, into a voltage signal corresponding to received light power. Incidentally, each PD constituting the PD-TIA array 212 may be formed as a "balanced PD."

The "balanced PD" includes two PDs that receive light of a positive phase and a negative phase which light is output from one 90-degree hybrid, and performs differential output of current signals of the respective PDs. For example, the "balanced PD" demodulates the phase information of the optical signals by differential detection. The reception characteristics of the optical signals may be improved by the differential detection. Incidentally, the "balanced PD" may be referred to as a "balanced receiver."

The ADC 113 converts the voltage signals obtained in the PD-TIA array 212 into digital signals, and inputs the digital signals to the DSP 111.

Increasing the power of the transmission light and the LO light is one of important considerations for increasing transmission distance in digital coherent optical transmission. However, as described above, output optical power is limited and power shortage may occur in the configuration in which the output light of one light source 12 is branched into two pieces of light, for example, the transmission light and the LO light.

Providing the optical transceiver 10 with an optical amplifier (for example, an SOA) that amplifies the output light of the light source 12 before branching is considered to compensate for the power shortage.

The output optical power of the light source 12 may be increased by approximately +15 dBm by using the SOA. However, when an optical branching coupler, for example, is used as an optical part for branching the output light of the light source 12 into two pieces of light, the power of the branched light is limited to an increase of approximately +12 dBm due to an insertion loss (for example, approximately 3 dB) of the optical branching coupler.

Here, in a configuration in which the output light of the light source 12 is branched into two pieces of light by the optical branching coupler, and one of the two branched pieces of light is amplified in the SOA and input as transmission light to the optical modulator 14, suppose that an SOA gain is 15 dBm, that a loss in the optical branching coupler is at least 3 dB, and that a loss in the optical modulator 14 is, for example, 15 dB. In this case, the transmission light power of the optical transceiver 10 is 15−3−15=−3 dBm.

The transmission light power is limited according to the transmission distance, and a maximum value of the transmission light power is limited because a nonlinear effect occurs when the optical power input to the optical transmission line is too high. The maximum value is approximately 0 dBm/ch (per wavelength channel of wavelength division multiplexed (WDM) signal light), though the maximum value is different depending on the kind of the optical transmission line and a modulation system.

Hence, when the transmission light power is "−3 dBm" as described above, the optical power is insufficient by 3 dB from a transmission quality condition (for example, 0 dBm/ch) considered to be best. It is therefore desirable to be able to increase the transmission light power by an additional 3 dB (for example, twofold).

In addition, when consideration is given to compensation (for example, a margin) for variances and variations as illustrated in the following (1) to (4), the power of the transmission light and the LO light may be desired to be increased further.

(1) Loss variances due to manufacturing variations in optical modulators and variations in amplitude of driving signals;
(2) Difference between light transmission and reception characteristics of optical transceivers in a case where transmission and reception are performed between the optical transceivers manufactured by different vendors;
(3) Individual variations in reception band and noise characteristics of optical receivers; and
(4) Variances in respective transmission conditions for up (upstream) transmission and down (downstream) transmission (variances in loss of the optical transmission lines, an increase in distance, obstacle transfer, and the like).

Further, the variances and variations as described above may be a factor in decreasing the yield of parts (the light source 12, the optical modulator 14, the driver amplifiers 15, and the optical receiver 21) constituting the optical transceiver 10. As a result, cost reduction and ease of procurement of the optical transceiver 10 may be limited.

Accordingly, in the present embodiment, a configuration of the optical branching circuit 13 is devised to suppress power loss of the transmission light and the LO light and thus make it easy to secure power required for the transmission light and the LO light even in the configuration in which the output light of the light source 12 is shared by being branched into two pieces of light, for example, the transmission light and the LO light.

Example of Configuration of Optical Branching Circuit 13

An example of configuration of the optical branching circuit 13 illustrated in FIG. 1 will be described in the following.

Figure 2:
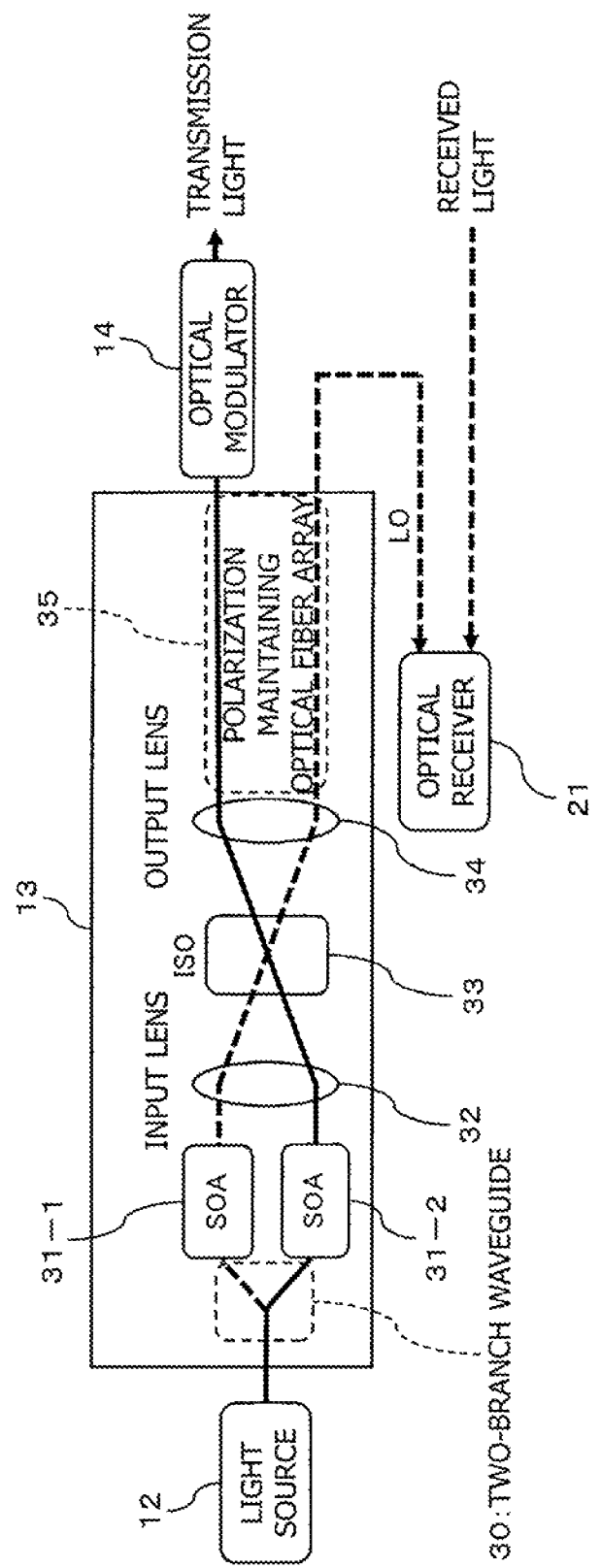
FIG. 2 is a block diagram illustrating an example of configuration of an optical branching circuit according to one embodiment.

FIG. 2 is a block diagram illustrating an example of configuration of the optical branching circuit 13. As illustrated in FIG. 2, the optical branching circuit 13 may illustratively include a two-branch waveguide (splitter) 30, two SOAs 31-1 and 31-2, an input lens 32, an optical isolator (ISO) 33, an output lens 34, and a polarization maintaining optical fiber array 35.

The two-branch waveguide 30 is an example of an optical branching unit. The two-branch waveguide 30 branches the output light of the light source 12 into two pieces of light, and guides one of the two branched pieces of light to the SOA 31-1 and guides the other of the two branched pieces of light to the SOA 31-2.

The SOAs 31-1 and 31-2 are an example of optical amplifiers. The SOAs 31-1 and 31-2 each amplify the branched light input from the two-branch waveguide 30, and output the amplified branched light to the input lens 32. For example, the two branched pieces of light branched in the two-branch waveguide 30 are individually amplified by the SOAs 31-1 and 31-2.

Incidentally, in the example of FIG. 2, the branched light amplified by the SOA 31-1 (dotted line arrow) is input as the LO light to the optical receiver 21, and the branched light amplified by the SOA 31-2 (solid line arrow) is input as the transmission light to the optical modulator 14.

Figure 3:
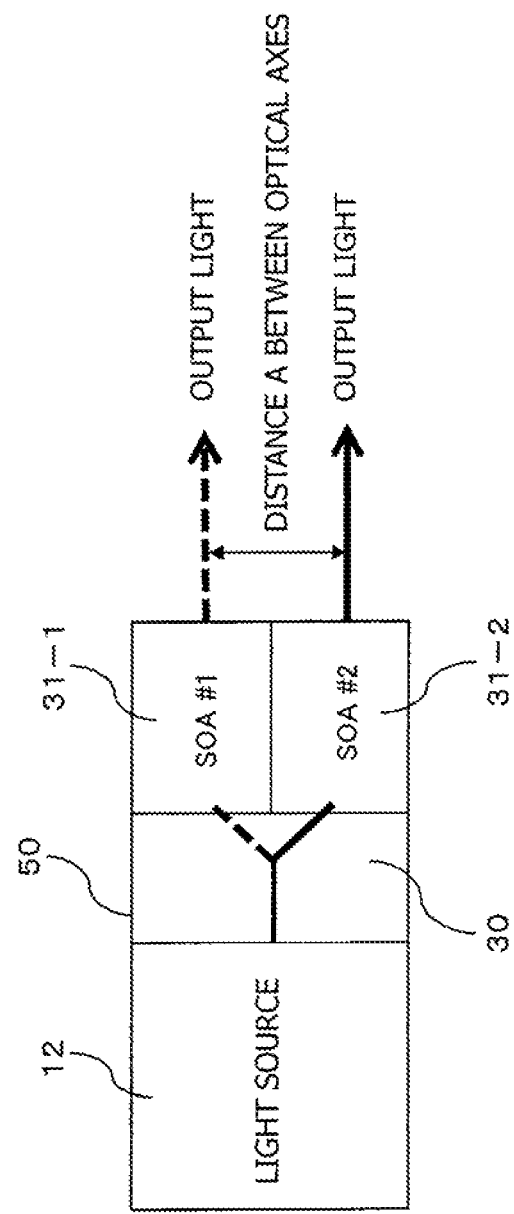
FIG. 3 is a block diagram illustrating an example of configuration of an optical branching circuit according to one embodiment.

FIG. 3 is a block diagram illustrating an example of configuration of the optical branching circuit 13. As illustrated in FIG. 3, the light source 12, the two-branch waveguide 30, and the SOAs 31-1 and 31-2 may be integrated on one semiconductor chip 50. The integration makes it possible to achieve a reduction in size of blocks including the light source 12, the two-branch waveguide 30, and the SOAs 31-1 and 31-2, a cost reduction due to an improvement in productivity, and the like. As a result, reductions in size and cost of the optical branching circuit 13 may be achieved.

The input lens 32 is illustratively disposed at a position such that the respective pieces of output light of the SOAs 31-1 and 31-2 enter end portions of the input lens 32 which end portions are separated from the center of the input lens 32 in a radial direction. The input lens 32 outputs the incident light to the optical isolator 33. For example, the respective optical axes of the pieces of light output from the SOAs 31-1 and 31-2 do not need to coincide with the optical axis of the input lens 32.

The optical isolator 33 transmits the transmission light and the LO light made incident thereon from the input lens 32 to the output lens 34, and blocks light traveling in an opposite direction. For example, the optical isolator 33 is an optical part shared between the transmission light and the LO light.

However, as illustrated in FIG. 2, the transmission light and the LO light are incident on the optical isolator 33 at incidence positions different from each other, propagated through optical paths different from each other within the optical isolator 33, and emitted from emission positions different from each other. Hence, the two optical axes of the transmission light and the LO light may intersect each other in an internal space of the optical isolator 33.

A polarization-dependent type optical isolator may be applied as the optical isolator 33. The polarization states of the respective branched pieces of light at the position at which the optical isolator 33 is applied are determined. Thus, a "polarization-dependent type" optical isolator, which is inexpensive and has a simple structure, may be applied as the optical isolator 33. However, a "polarization-independent type" optical isolator may be applied as the optical isolator 33.

Figure 4:
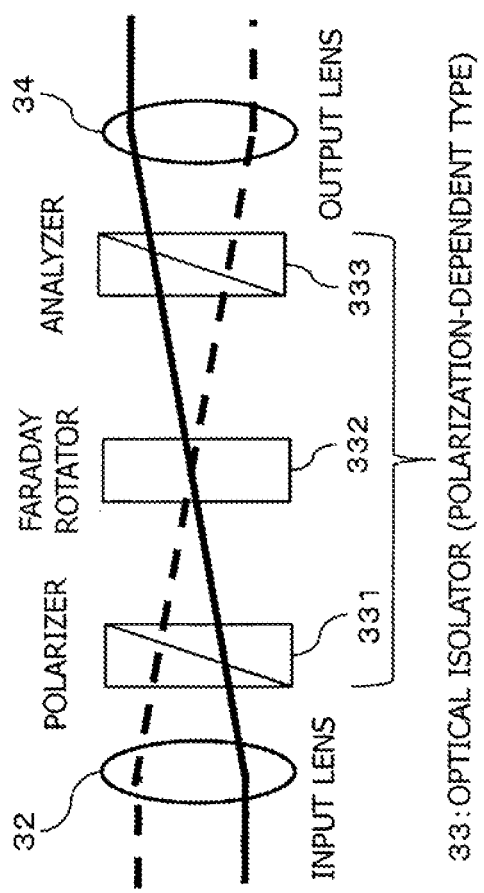
FIG. 4 is a block diagram illustrating an example of configuration of an optical isolator (ISO) illustrated in FIG. 2.

FIG. 4 illustrates an example of configuration of the polarization-dependent type optical isolator 33. As illustrated in FIG. 4, the polarization-dependent type optical isolator 33 may illustratively include a polarizer 331, a Faraday rotator 332, and an analyzer 333.

The light incident from the input lens 32 is converted into linearly polarized light by the polarizer 331, and is incident on the Faraday rotator 332. The Faraday rotator 332 rotates the plane of polarization of the linearly polarized light incident from the polarizer 331 by 45 degrees, and makes the linearly polarized light incident on the analyzer 333.

The optical axis of the analyzer 333 is disposed so as to be inclined by 45 degrees with respect to the optical axis of the polarizer 31. Hence, the linearly polarized light output from the Faraday rotator 332 has a plane of polarization coinciding with the optical axis of the analyzer 333, and therefore passes through the analyzer 333 and is emitted to the output lens 34.

On the other hand, as for light propagating from the output lens 34 toward the input lens 32 (return light), only linearly polarized light including a plane of polarization coinciding with the optical axis of the analyzer 333 passes through the analyzer 333, and enters the Faraday rotator 332.

The Faraday rotator 332 rotates the plane of polarization of the return light by 45 degrees in an opposite direction from the light propagating in a forward direction. Thus, the return light has a plane of polarization rotated by 90 degrees after traveling forward and backward. Hence, it is difficult for the return light output from the Faraday rotator 332 to the polarizer 331 to pass through the polarizer 331.

Thus, the polarization-dependent type optical isolator 33 transmits the light incident from the input lens 32 to the output lens 34, and blocks the light propagating in the opposite direction and returning to the input lens 32.

Here, as already described, the transmission light and the LO light incident on different positions of the input lens 32 pass through the polarizer 331, the Faraday rotator 332, and the analyzer 333 in different optical paths, respectively, as indicated by a solid line and a dotted line in FIG. 4.

The two different optical paths may intersect each other in the Faraday rotator 332. For example, the Faraday rotator 332 may be disposed at a position corresponding to a point of intersection of the two optical paths of the transmission light and the LO light.

The transmission light and the LO light passing through the Faraday rotator 332 in the forward direction are incident on different positions of the incidence surface of the analyzer 333, and are incident from different positions of the emission surface of the analyzer 333 onto different positions of the output lens 34 which positions are separated from the optical axis of the output lens 34.

Thus, in the optical branching circuit 13 according to the present embodiment, neither the transmission light nor the LO light as branched pieces of light passes through the optical axes of the input lens 32 and the output lens 34. FIG. 5B is a schematic side view of an aspherical lens. Therefore, as schematically illustrated in FIG. 5B, a lens (for example, an aspherical lens) having smaller astigmatism than a spherical lens may be applied as the input lens 32 and the output lens 34.

The application of a lens having smaller astigmatism than a spherical lens may suppress a decrease in efficiency of optical coupling to the optical isolator 33, for example. Hence, power loss of the transmission light and the LO light may be suppressed. Incidentally, FIG. 5A is a diagram schematically illustrating that a spherical lens has astigmatism.

The transmission light and the LO light emitted from different positions of the output lens 34 may be individually made incident on and coupled to different polarization maintaining (PM) fibers constituting the polarization maintaining optical fiber array 35 illustrated in FIG. 2.

Figure 6:
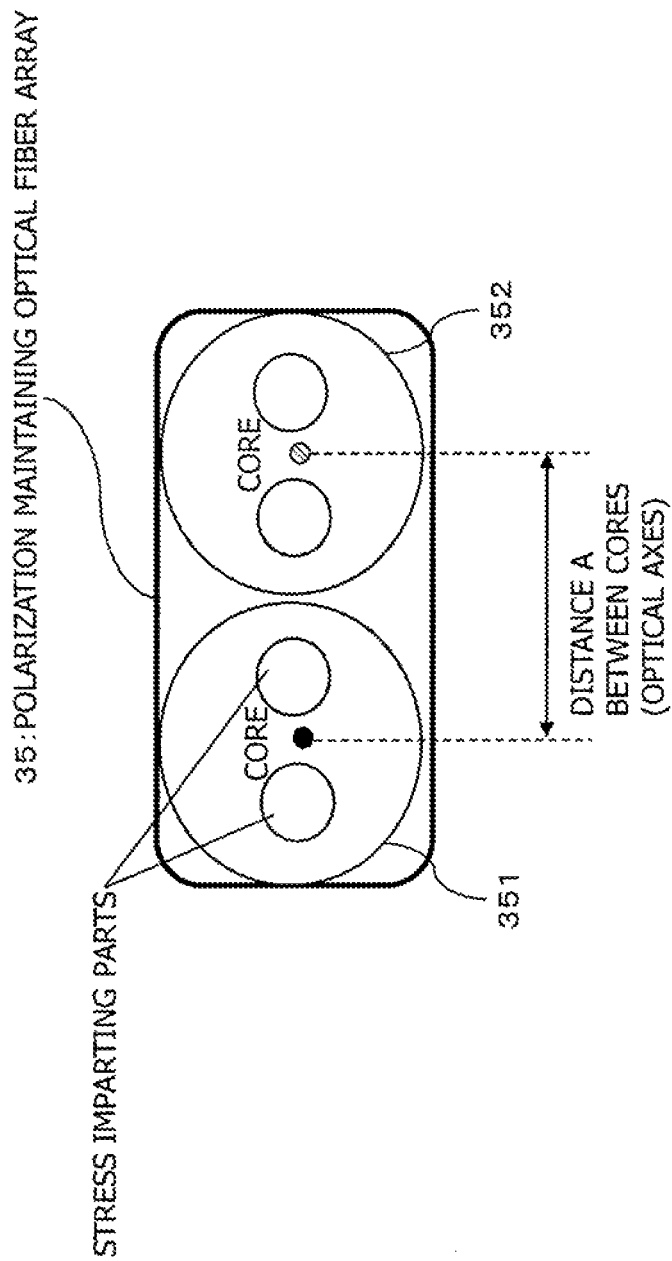
FIG. 6 is a schematic sectional view of a polarization maintaining optical fiber array illustrated in FIG. 2.

FIG. 6 is a schematic sectional view of a polarization maintaining optical fiber array. The polarization maintaining optical fiber array illustrated in FIG. 6 may be the polarization maintaining optical fiber array 35 illustrated in FIG. 2. As illustrated in FIG. 6, the polarization maintaining optical fiber array 35 includes two PM fibers 351 and 352. The transmission light enters one of the two PM fibers 351 and 352. The LO light enters the other of the two PM fibers 351 and 352.

Illustratively, supposing that the transmission light as one branched piece of light enters the PM fiber 351, and that the LO light as the other branched piece of light enters the PM fiber 352, the output of the PM fiber 351 is coupled to the optical modulator 14, and the output of PM fiber 352 is coupled to the optical receiver 21.

Incidentally, a core interval A between the two PM fibers 351 and 352 may, for example, coincide with an optical axis interval A between the pieces of output light of the two SOAs 31-1 and 31-2 integrated on the semiconductor chip 50 in FIG. 3.

This facilitates optical alignment of the semiconductor chip 50, the lenses 32 and 34, and the polarization maintaining optical fiber array 35 in the optical branching circuit 13, so that productivity of the optical branching circuit 13 may be improved. Hence, a reduction in cost of the optical branching circuit 13, or in turn the optical transceiver 10, may be achieved.

In the optical branching circuit 13 including the configuration as described above, the two-branch waveguide 30 is disposed between the light source 12 and the SOAs 31-1 and 31-2. Therefore, the two-branch waveguide 30 causes an optical loss (for example, approximately 3 dB) in the output light of the light source 12. For example, the two-branch waveguide 30 is an example of an optical loss medium.

Therefore, optical power input from the light source 12 to each of the SOAs 31-1 and 31-2 may be decreased by approximately 3 dB, and even when, for example, the output optical power of the light source 12 is increased for a greater transmission distance or the like, the SOAs 31-1 and 31-2 are easily operated in an appropriate operating range.

As a comparative example, a configuration is assumed in which the output light of the light source 12 is branched into two pieces of light after being amplified by one SOA. Supposing that optical power input from the light source 12 to the one SOA in the configuration is $P_B$ [dBm], the optical branching circuit 13 according to the present embodiment may decrease the optical power input to each of the SOAs 31-1 and 31-2 to $P_A$ (<$P_B$) [dBm].

Figure 7:
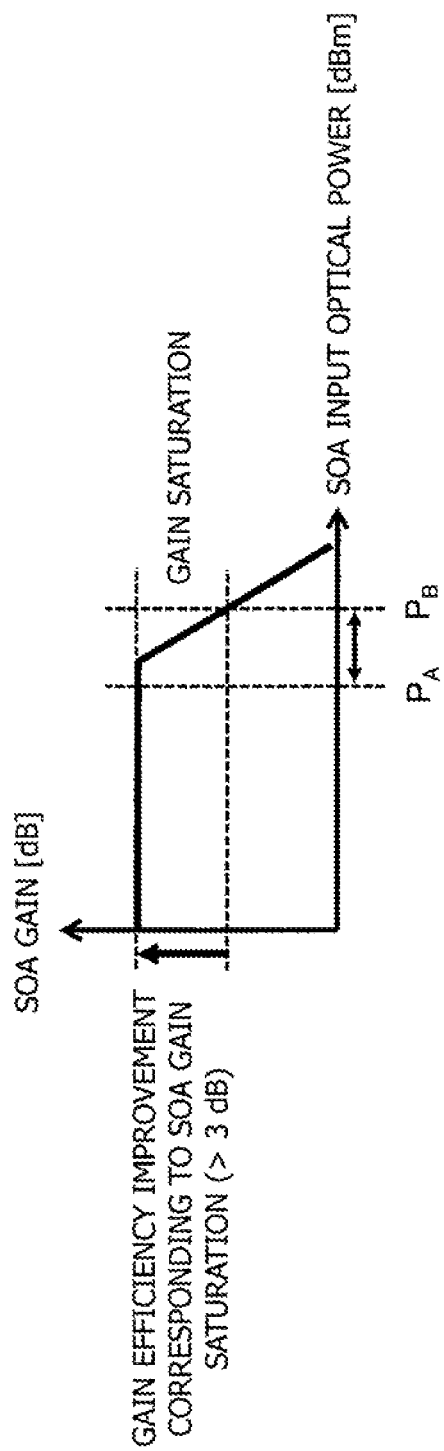
FIG. 7 is a diagram illustrating an example of an input power versus gain characteristic of a semiconductor optical amplifier (SOA) illustrated in FIG. 2 and FIG. 3.

FIG. 7 is a diagram illustrating an example of an input power versus gain characteristic of an SOA illustrated in FIG. 2 and FIG. 3. Here, when the input optical power versus gain characteristic of an SOA is a characteristic as illustrated in FIG. 7 (where the driving current of the SOA is fixed), and the input optical power is $P_B$, the SOA operates in a saturation region, thus decreasing gain efficiency.

For example, as the output of the light source 12 is increased, the optical power input to the SOAs 31-1 and 31-2 becomes too strong, and therefore the SOAs 31-1 and 31-2 operate in a saturation region beyond an appropriate operating range, thus decreasing gain efficiency.

On the other hand, when the input optical power is decreased from $P_B$ to $P_A$, the SOAs 31-1 and 31-2 each operate in an appropriate operating range in which gain is not saturated. Therefore, gain efficiency is improved as compared with the case where the input optical power is $P_B$. If an amount of optical loss caused by the two-branch waveguide 30 is approximately 3 dB, an improvement exceeding 3 dB may be expected in the gain efficiency of the SOAs 31-1 and 31-2. Hence, the foregoing shortage (3 dB) of the transmission light power may be resolved.

In addition, because the SOAs 31-1 and 31-2 may be operated in the appropriate operating range, the driving currents of the SOAs 31-1 and 31-2 may also be optimized for the gain efficiency to be obtained, and thus contributes to lower power consumption of the optical transceiver 10.

Further, in the optical branching circuit 13 including the configuration illustrated in FIG. 2, the gains of the SOAs 31-1 and 31-2 may be individually adjusted by individually adjusting the driving currents of the SOAs 31-1 and 31-2 (for example, adjusting the driving currents of the SOAs 31-1 and 31-2 independently of each other).

Hence, it is possible to adjust the transmission light power and the LO light power individually, and possible to vary a ratio between the transmission light power and the LO light power. In addition, because the transmission light power and the LO light power may be adjusted by the individual SOAs 31-1 and 31-2, an optical power adjustment range may be expanded as compared with the configuration in which the output light is branched into two pieces of light after being amplified by the SOA.

Because the transmission light power and the LO light power may be adjusted individually, in a case where communication is performed between two optical transceivers 10, for example, control may be performed such that the transmission light power and the LO light power are mutually optimized between the two optical transceivers 10 based on the reception characteristics and power consumption of the two optical transceivers 10. An example of the control will be described later.

Incidentally, a variable optical branching device that may vary a branching ratio of the output light of the light source 12 may be applied to adjust the transmission light power and the LO light power individually. However, the LO light power and the transmission light power are limited by the insertion loss of the variable optical branching device. In addition, the variable optical branching device may include a movable unit and a temperature adjuster in order to vary the branching ratio, and thus tends to increase in size and cost. Further, because of the presence of the movable unit and the temperature adjuster, a polarization extinction ratio, control accuracy, reliability, and the like tend to decrease.

Modification of Optical Branching Circuit 13

Figure 8:
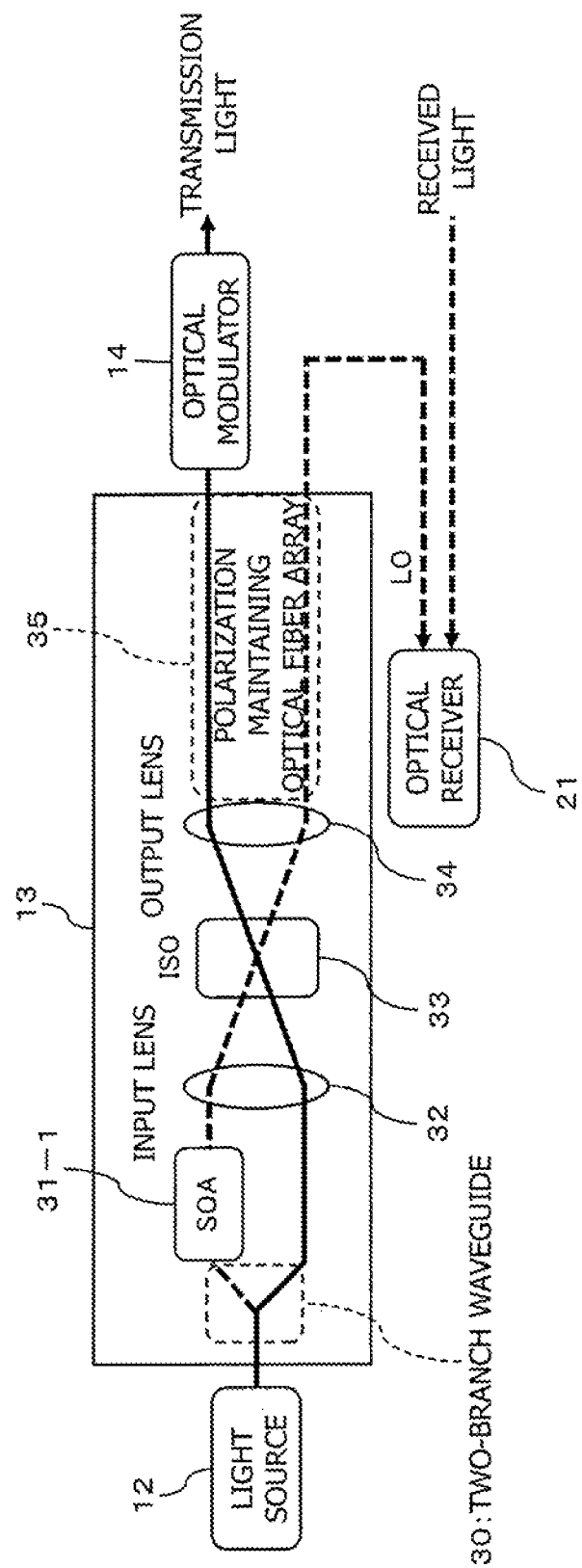
FIG. 8 is a block diagram illustrating a modification of an optical branching circuit illustrated in FIG. 2 and FIG. 3.
Figure 9:
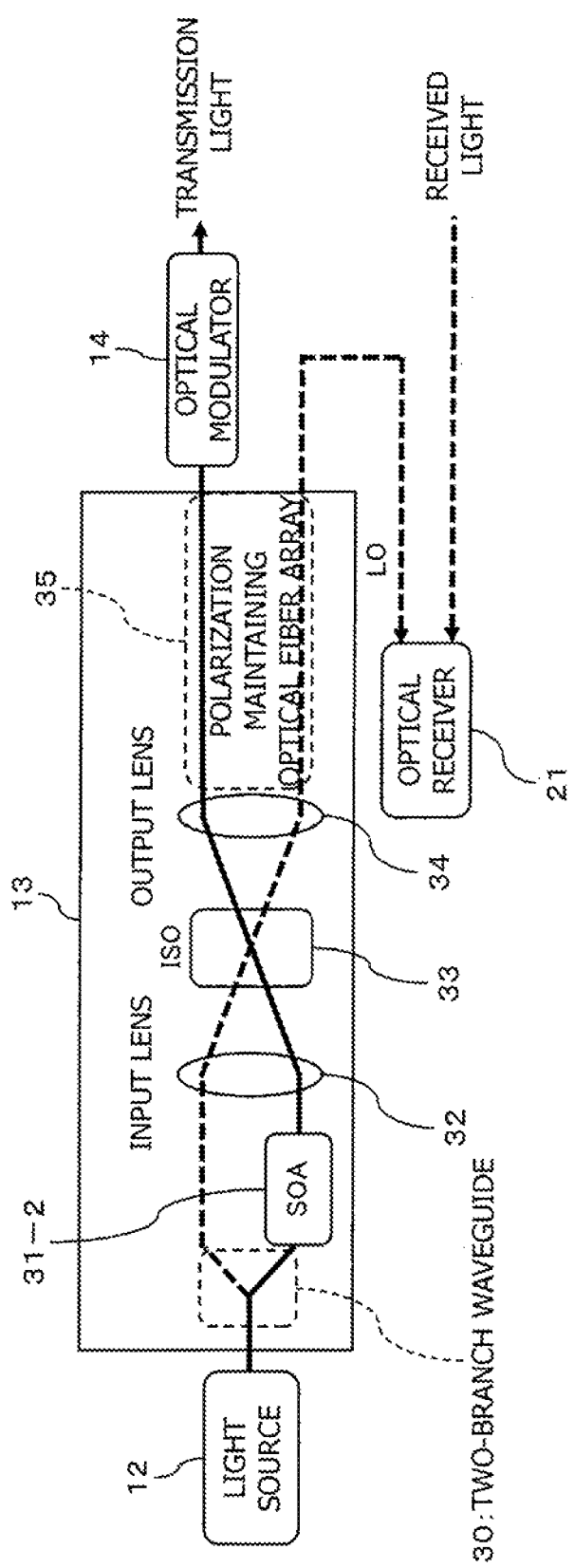
FIG. 9 is a block diagram illustrating a modification of an optical branching circuit illustrated in FIG. 2 and FIG. 3.

FIG. 8 is a block diagram illustrating a modification of the optical branching circuit illustrated in FIG. 2 and FIG. 3. FIG. 9 is a block diagram illustrating a modification of the optical branching circuit 13 illustrated in FIG. 2 and FIG. 3. The optical branching circuit illustrated in FIG. 8 and FIG. 9 may be the optical branching circuit illustrated in FIG. 1. Incidentally, the optical branching circuit 13 illustrated in FIG. 2 includes the SOAs 31-1 and 31-2 provided to both of the two outputs of the two-branch waveguide 30. However, as illustrated in FIG. 8 and FIG. 9, the optical branching circuit 13 may include the SOA 31-1 or 31-2 provided to only one of the two outputs of the two-branch waveguide 30.

In the configuration example of FIG. 8, the LO light to be input to the optical receiver 21 is amplified by the SOA 31-1. In the configuration example of FIG. 9, the transmission light to be input to the optical modulator 14 is amplified by the SOA 31-2.

When an increase in the output of the transmission light power is desired for a greater transmission distance, it is easier to increase the transmission light power by adjusting the driving current of the SOA 31-2 in the configuration example of FIG. 9 than in the configuration example of FIG. 8.

Incidentally, in order to adjust the transmission light power in the configuration example of FIG. 8, or adjust the LO light power in the configuration example of FIG. 9, it suffices to adjust the output optical power of the light source 12.

In both of the configuration examples of FIG. 8 and FIG. 9, the transmission light power and the LO light power may be individually adjusted by individually controlling the driven states of the light source 12 and the SOA 31-1 or 31-2.

Hence, as in the configuration example of FIG. 2, a power ratio between the transmission light power and the LO light power may be adjusted. However, a variable range of the power ratio is expanded more easily in the configuration example of FIG. 2 than in the configuration examples of FIG. 8 and FIG. 9.

Also in the configuration examples of FIG. 8 and FIG. 9, the light source 12, the two-branch waveguide 30, and one of the SOAs 31-1 and 31-2 may be integrated on one semiconductor chip 50 as illustrated in FIG. 3.

Incidentally, while the input lens 32, the isolator 33, and the output lens 34 are shared between the two optical paths of the transmission light and the LO light in the configuration examples of FIG. 2, FIG. 8, and FIG. 9, some or the whole of the input lens 32, the isolator 33, and the output lens 34 may be provided for each of the two optical paths individually.

For example, input lenses 32 may be provided for the two respective optical paths of the transmission light and the LO light. In addition, isolators 33 may be provided for the two respective optical paths of the transmission light and the LO light. Further, output lenses 34 may be provided for the two respective optical paths of the transmission light and the LO light.

In addition, when inter-node transmission and reception optical power control to be described later is applied, the configuration of the optical branching circuit 13 does not need to be limited to the configurations illustrated in FIGS. 2 to 5, FIG. 8, and FIG. 9. For example, a variable branching device in which a branching ratio is variable may be applied as the optical branching circuit 13 to be able to control the transmission light power and the LO light power individually. However, the application of the configurations illustrated in FIGS. 2 to 5, FIG. 8, and FIG. 9 to the optical branching circuit 13 is more advantageous than the application of a variable branching device to the optical branching circuit 13 in terms of performance, circuit scale, and cost.

Inter-Node Transmission and Reception Optical Power Control

Next, description will be made of an example in which the optical transceiver 10 is provided for each of two nodes, and control is performed such that transmission light power and LO light power are mutually optimized between the nodes.

Figure 10:
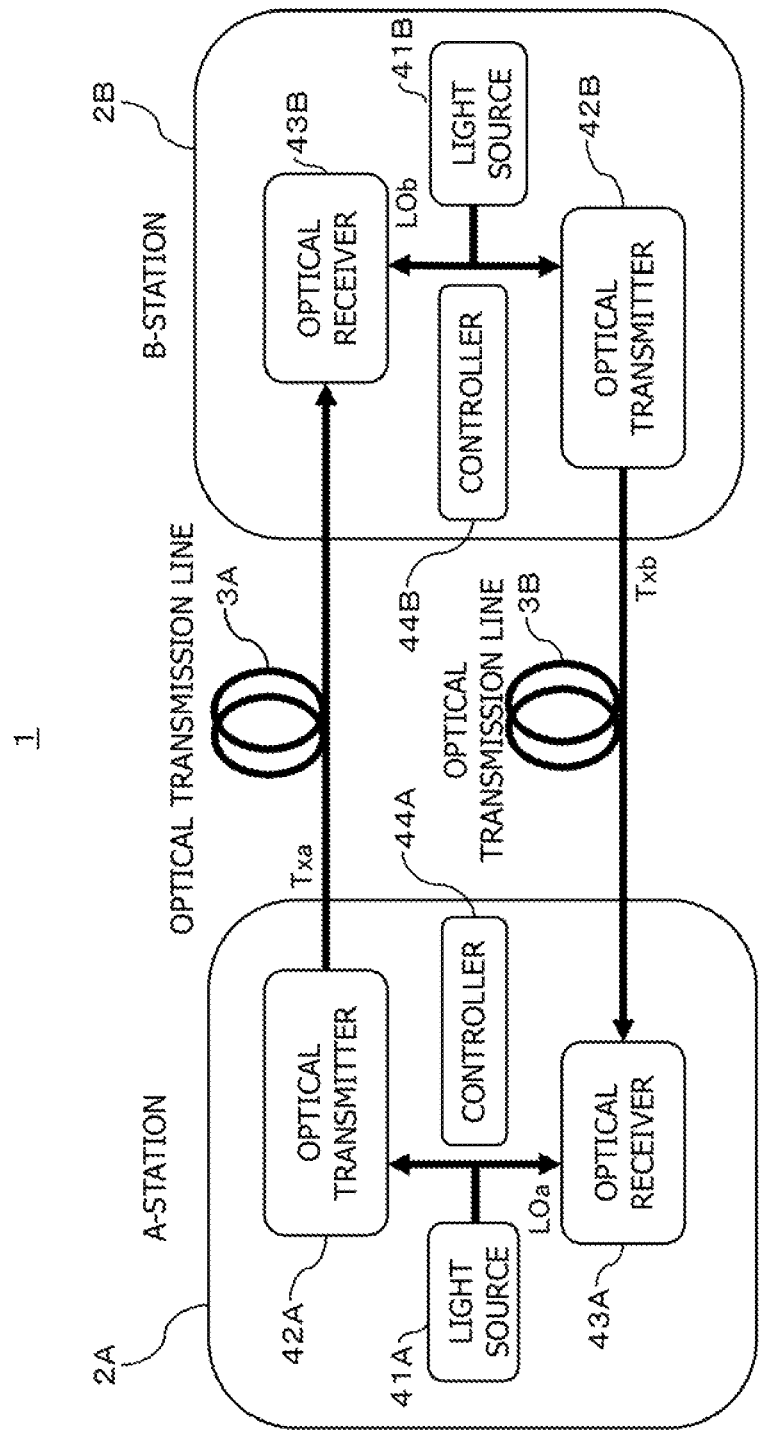
FIG. 10 is a block diagram illustrating an example of configuration of an optical communication system according to one embodiment.

FIG. 10 is a block diagram illustrating an example of configuration of an optical communication system according to one embodiment. The optical communication system 1 illustrated in FIG. 10 illustratively includes an optical transmission device 2A and an optical transmission device 2B. An "optical transmission device" may be referred to as an "optical transmission station" or a "node." In the following, for convenience, the optical transmission station 2A will be referred to as an "A-station," and the optical transmission station 2B will be referred to as a "B-station."

Incidentally, the optical communication system 1 may be referred to as an optical communication network 1. The optical communication system 1 may be an optical transport network (OTN) as a non-restrictive example. An Ethernet (registered trademark) frame may be mapped to an OTN frame. The "optical transmission station" may be an element of a mesh network, or may be an element of a ring network. In addition, the "optical transmission station" may be an optical add-drop multiplexer (OADM).

As illustrated in FIG. 10, the A-station and the B-station may be coupled to each other so as to be capable of bidirectional optical communication by optical transmission lines 3A and 3B. Illustratively, the optical transmission line 3A transmits signal light from the A-station to the B-station, and the optical transmission line 3B transmits signal light from the B-station to the A-station.

The A-station may include a light source 41A, an optical transmitter 42A, an optical receiver 43A, and a controller 44A. As with the A-station, the B-station may include a light source 41B, an optical transmitter 42B, an optical receiver 43B, and a controller 44B.

Incidentally, in the following, when the A-station and the B-station are not distinguished from each other, the A-station and the B-station will be referred to as simply as "stations 2" or "nodes 2." In addition, when whether elements belong to the A-station or the B-station is not distinguished, description will be made by omitting the reference characters A and B, as in a light source 41, an optical transmitter 42, an optical receiver 43, and a controller 44, for example.

The light source 41, the optical transmitter 42, and the optical receiver 43 may be regarded as being included in the foregoing optical transceiver 10. For example, the light source 41 may be regarded as corresponding to the light source 12 illustrated in FIGS. 1 to 3, and the optical transmitter 42 may be regarded as corresponding to blocks including the optical branching circuit 13, the optical modulator 14, and the driver amplifiers 15 illustrated in FIGS. 1 to 3. In addition, the optical receiver 43 may be regarded as corresponding to the optical receiver 21 illustrated in FIG. 1 and FIG. 2.

The controller 44 includes a processor not illustrated, may illustratively control LO light power and transmission light power individually by individually controlling an LO light power adjuster 421 and a transmission light power adjuster 422.

Illustratively, the LO light power adjuster 421 may correspond to one SOA 31-1 of the optical branching circuit 13 illustrated in FIG. 2, and the transmission light power adjuster 422 may correspond to the other SOA 31-2 of the optical branching circuit 13.

The controller 44 may individually control the gains of the SOAs 31-1 and 31-2 by individually controlling the driving currents of the SOAs 31-1 and 31-2. When the gains of the SOAs 31-1 and 31-2 are individually controlled, the transmission light power and the LO light power are controlled independently of each other, as already described.

Incidentally, the light source 41 and the SOAs 31-1 and 31-2 are an example of an optical output medium that outputs light. The SOAs 31-1 and 31-2 are also an example of an "optical output power control medium" or an "optical output power adjusting medium" capable of controlling or adjusting the optical output power.

The optical output power control medium may include an optical fiber amplifier such as an erbium-doped optical fiber amplifier (EDFA), an optical attenuator in which an amount of optical attenuation is fixed or variable, and an optical branching device in which a branching ratio is variable. Further, because the optical output power may be controlled also by controlling the driving current of the light source 41, the optical output power control medium is not limited to the SOAs and the optical fiber amplifier, the variable optical attenuator, the variable optical branching device, and the like provided on the output side of the light source 41, but may include the light source 41.

In addition, the control of the optical output power may include control in which the light source 41 and the medium provided on the output side of the light source 41 (the SOAs and the optical fiber amplifier, the variable optical attenuator, the variable optical branching device, and the like) are operatively associated with each other.

In addition, in the following description, for convenience, the driving current of the LO light power adjuster 421 (for example, the SOA 31-1) may be referred to as an "LO light power driving current," and the driving current of the transmission light power adjuster 422 (for example, the SOA 31-2) may be referred to as a "transmission light power driving current."

Figure 11:
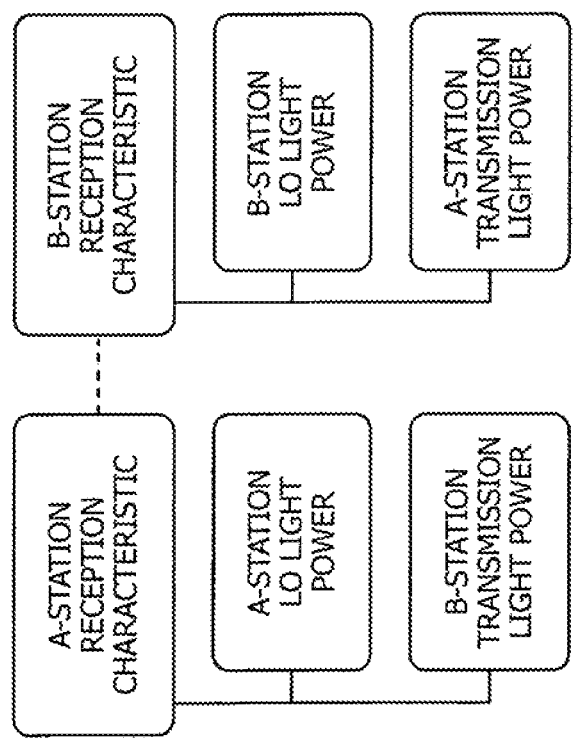
FIG. 11 is a diagram illustrating correlations of reception characteristics in optical transmission stations illustrated in FIG. 10 with transmission light power and local (LO) light power.

FIG. 11 is a diagram illustrating correlations of reception characteristics in the optical transmission stations illustrated in FIG. 10 with transmission light power and LO light power. Here, as schematically illustrated in FIG. 11, a reception characteristic in the A-station varies depending on the LO light power of the A-station and the transmission light power of the partner node B. Similarly, a reception characteristic in the B-station varies depending on the LO light power of the B-station and the transmission light power of the partner node A.

For example, the reception characteristic in the A-station (B-station) is correlated with the LO light power of the A-station (B-station) and the transmission light power of the B-station (A-station) as a communication partner. Hence, when the transmission light power of the A-station (B-station) varies, the reception characteristic in the B-station (A-station) may vary.

In addition, the transmission light power and the LO light power of the A-station (B-station) vary according to the driving currents of the SOAs 31-2 and 31-1, respectively, for example. Thus, when the transmission light power of the A-station (B-station) varies, the power consumption of the A-station (B-station) also varies.

Illustratively, the controller 44 may individually control the transmission light power and the LO light power at the A-station or the B-station as an own station based on information regarding the reception characteristics of the A-station and the B-station and information regarding the power consumption of the A-station and the B-station (which information may be referred to as "parameters").

Incidentally, the "information regarding the reception characteristics" may be abbreviated to "reception characteristic information," and the "information regarding the power consumption" may be abbreviated to "power consumption information." The "power consumption information" is correlated with the driving currents (or consumed currents) of the respective SOAs 31-1 and 31-2, and may therefore be read as "driving power information" or "consumed current information."

The reception characteristic information and the power consumption information may illustratively be mutually transmitted between the A-station and the B-station. The information transmission between the A-station and the B-station may be performed using an OSC, or may be performed via a network monitoring system such as an NMS, or an OPS.

The "OSC" is an abbreviation of an "optical supervisory channel." The "NMS" is an abbreviation of a "network management system." The "OPS" is an abbreviation of an "operation system." However, the use of an OSC for the information transmission may achieve a higher speed of control than the information transmission via a network monitoring system.

The controllers 44A and 44B may individually and mutually control the transmission light power and the LO light power of the A-station and the B-station based on the transmitted information so that each of the A-station and the B-station achieves an appropriate power consumption while satisfying a given reception characteristic.

Figure 12:
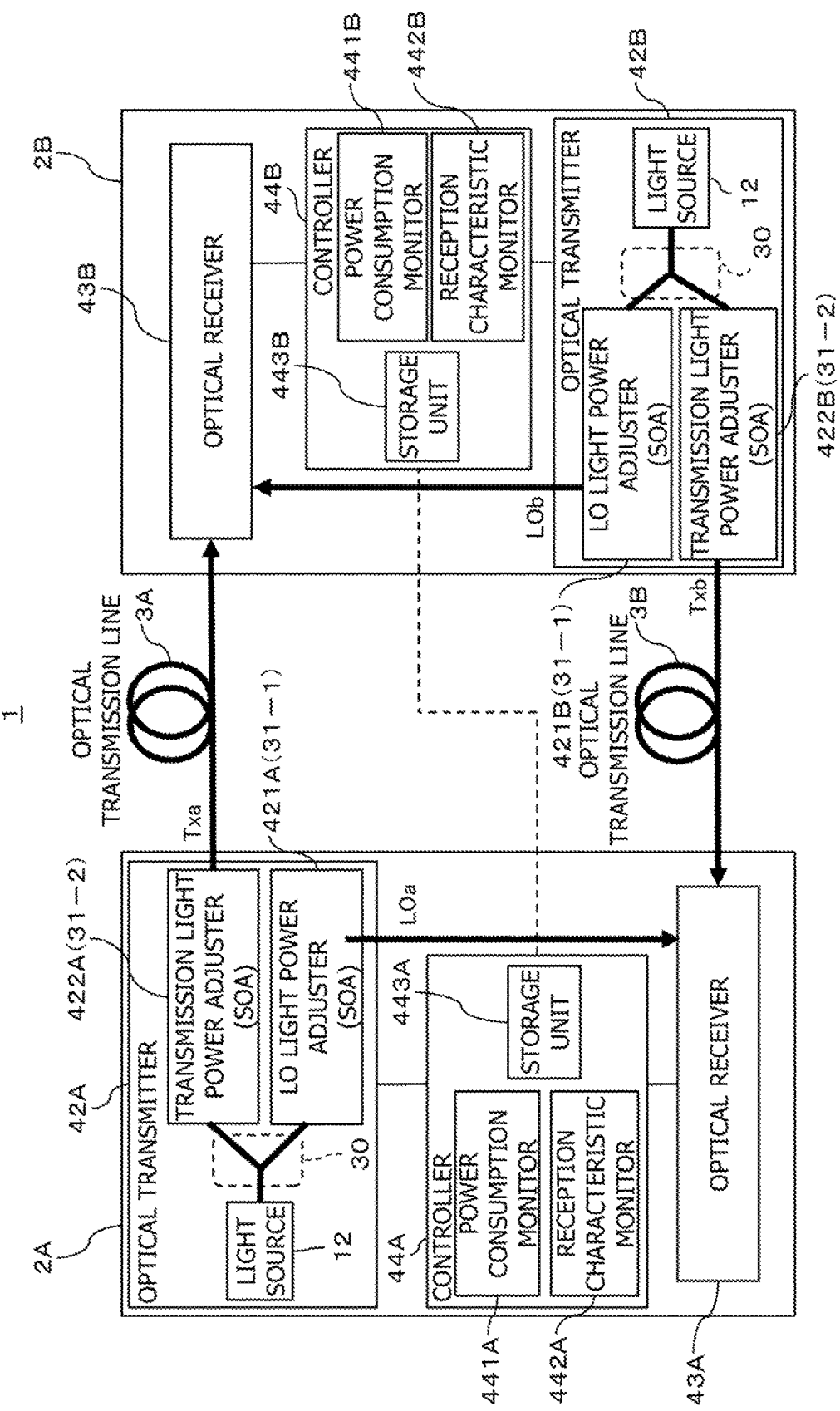
FIG. 12 is a block diagram illustrating an example of configuration of optical transmission stations illustrated in FIG. 10.

For this purpose, as illustrated in FIG. 12, the controller 44A of the A-station may include a power consumption monitor 441A, a reception characteristic monitor 442A, and a storage unit 443A. The controller 44B of the B-station may similarly include a power consumption monitor 441B, a reception characteristic monitor 442B, and a storage unit 443B. FIG. 12 is a block diagram illustrating an example of configuration of the optical transmission stations illustrated in FIG. 10.

The power consumption monitor 441 may illustratively monitor power consumed by the SOAs 31-1 and 31-2 by monitoring the driving currents of the respective SOAs 31-1 and 31-2.

The reception characteristic monitor 442 may illustratively monitor the reception characteristic in the optical receiver 43. The monitored reception characteristic may illustratively be one or more of an OSNR, an error rate, and received light power.

Illustratively, the OSNR may be a monitored value of an OSNR monitor (not illustrated) provided within the node 2, or may be a value calculated in the DSP 111 (see FIG. 1). The error rate may illustratively be a value (bit error rate (BER or the like)) calculated based on a count value of an error counter (not illustrated) of the DSP 111. The received light power may illustratively be a monitored value of an optical channel monitor (OCM; not illustrated) provided within the node 2.

The storage unit 443 may store a monitored value of the power consumption monitor 441 and a monitored value of the reception characteristic monitor 442. Incidentally, the storage unit 443 does not necessarily need to be provided within the controller 44, but it suffices for the storage unit 443 to be provided within the node 2.

Example of Operation

The following description will be made of an example of control of the transmission light power and the LO light power between the A-station and the B-station in the above-described optical communication system 1.

Before Start of System Operation

Figure 13:
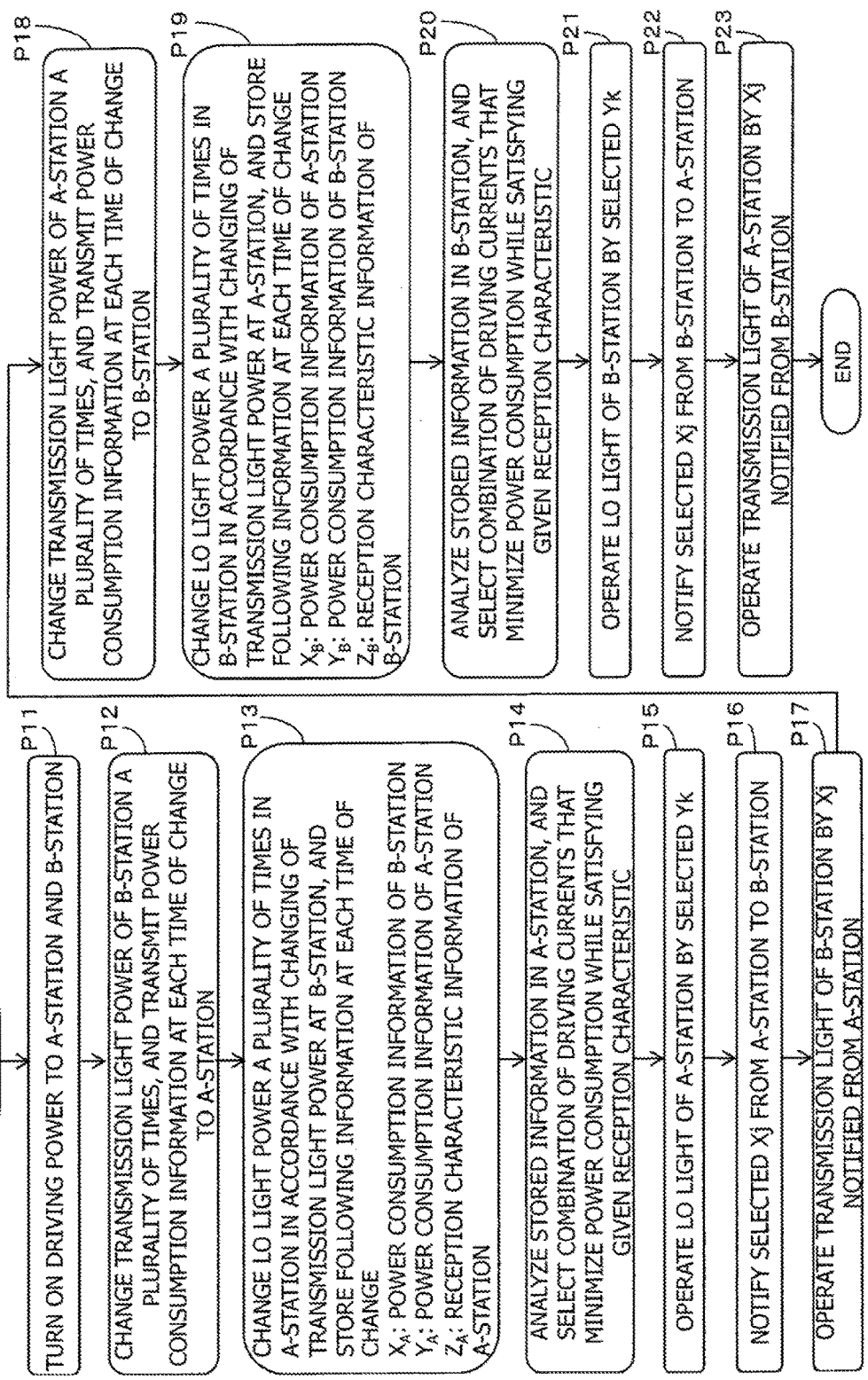
FIG. 13 is a flowchart illustrating an example of operation (before a start of operation) of an optical communication system illustrated in FIG. 10.

FIG. 13 is a flowchart illustrating an example of control of the transmission light power and the LO light power between the A-station and the B-station, the control being performed before a start of operation of the optical communication system 1.

As illustrated in FIG. 13, when power to the A-station and the B-station is turned on (operation P11), for example, the controller 44B of the B-station may change the transmission light power of the B-station a plurality of times by controlling the transmission light power adjuster 422B. Then, the controller 44B may transmit power consumption information monitored by the power consumption monitor 441B at each time of changing the transmission light power to the A-station by an OSC, for example (operation P12).

At the A-station, for example, the controller 44A may change the LO light power a plurality of times by controlling the LO light power adjuster 421A in accordance with the changing of the transmission light power at the B-station. The controller 44A may store the following information $X_A$, $Y_A$, and $Z_A$ in the storage unit 443A at each time of changing the LO light power (operation P13).

$X_A$: Power consumption information of the B-station
$Y_A$: Power consumption information of the A-station
$Z_A$: Reception characteristic information of the A-station Incidentally, the number of times and timing that the B-station changes the transmission light power and the number of times and timing that the A-station changes the LO light power may be shared as given information (for example, known information) between the A-station and the B-station in advance. Alternatively, a network monitoring system such as an NMS, or an OPS may indicate the number of times and timing of the changes to the A-station and the B-station.

FIG. 14A illustrates an example of information stored in the storage unit 443A of the A-station. FIG. 14A represents an example in which the B-station changes the transmission light power driving current four times to X1 to X4 [mA], and the A-station changes the LO light power driving current four times to Y1 to Y4 [mA].

Incidentally, the information of X1 to X4 [mA] in FIG. 14A is information transmitted from the B-station to the A-station in operation P12. In this case, the storage unit 443A of the A-station stores 16 different pieces of reception characteristic information $Z1_A$ to $Z16_A$. "$Z1_A$ to $Z16_A$" may be denoted as "Z1 to Z16" with "A" in "$Z1_A$ to $Z16_A$" omitted.

The controller 44A of the A-station may analyze the 16 different pieces of information as illustrated in FIG. 14A, and select a combination [Xj, Yk] of driving currents that minimize power consumption while satisfying a given reception characteristic (operation P14 in FIG. 13).

Incidentally, "j" and "k" each assume an integer of 1 to 4. In addition, "minimize power consumption" may be regarded as "maximize a margin with respect to a limit value of power consumption."

Figure 15:
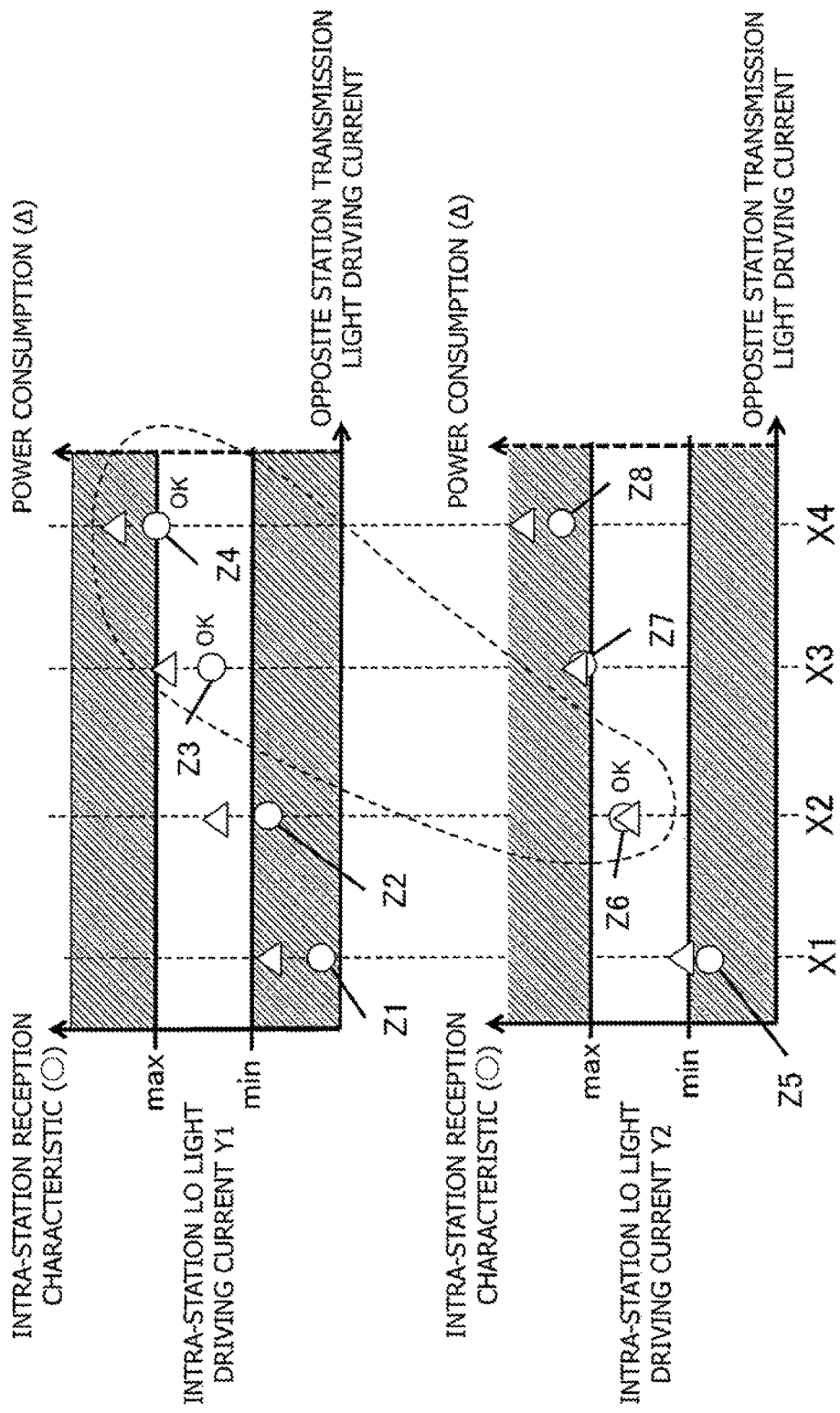
FIG. 15 is a schematic diagram illustrating an example of selection of a combination of a transmission light power driving current and an LO light driving current that satisfy a reception characteristic in an optical transmission station illustrated in FIG. 10 and FIG. 12.

FIG. 15 is a schematic diagram illustrating an example of selection of a combination of a transmission light power driving current and an LO light driving current that satisfy a reception characteristic in the optical transmission station illustrated in FIG. 10 and FIG. 12. As schematically illustrated in FIG. 15, for example, attention will be directed to a total of eight different combinations (reception characteristic information Z1 to Z8) of "X1," "X2," "X3," and "X4" with respect to "Y1" and "Y2."

Figure 16:
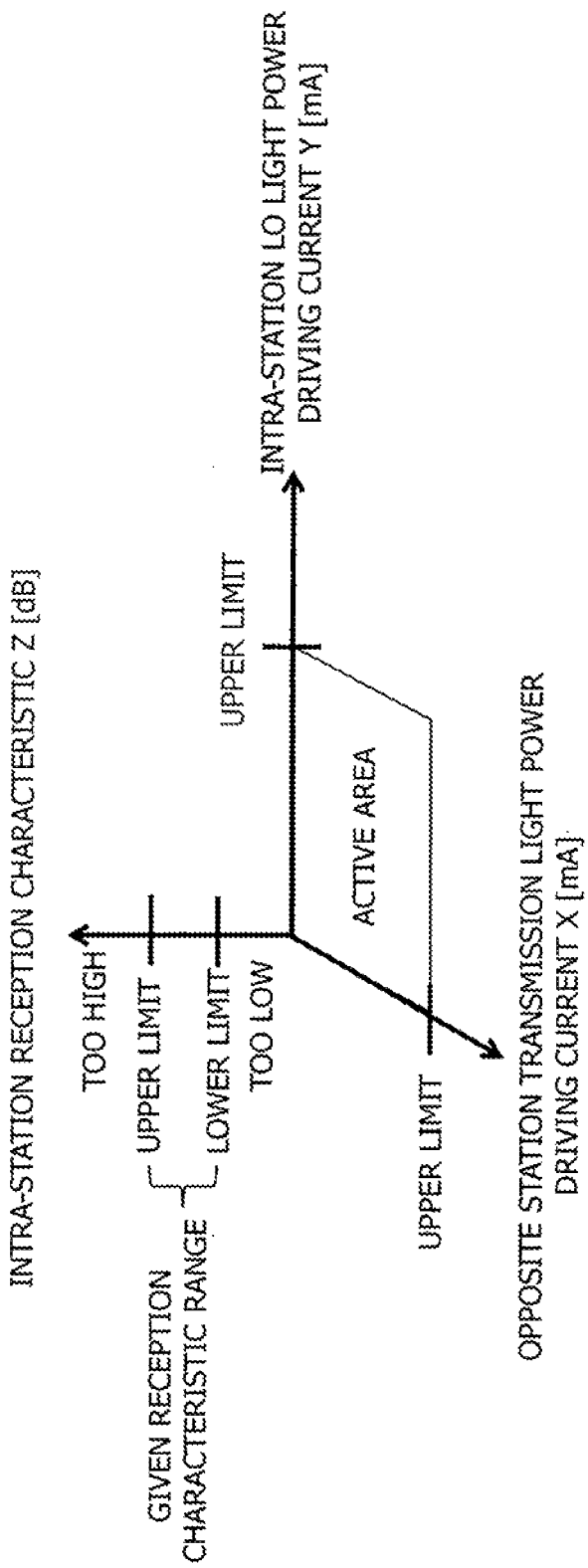
FIG. 16 is a schematic diagram illustrating an example of relation between a reception characteristic in an optical transmission station illustrated in FIG. 10 and FIG. 12, a transmission light power driving current, and an LO light driving current.

In the example of FIG. 15, the reception characteristic of the A-station falls within a given range defined by a minimum value and a maximum value as illustrated in FIG. 16 when the reception characteristic of the A-station is Z3 for a combination of [X3, Y1], Z4 for a combination of [X4, Y1], and Z6 for a combination of [X2, Y2]. FIG. 16 is a schematic diagram illustrating an example of relation between a reception characteristic in the optical transmission station illustrated in FIG. 10 and FIG. 12, a transmission light power driving current, and an LO light driving current.

Incidentally, the reception characteristic range may be an allowable range, and too low a reception characteristic level and too high a reception characteristic level outside the allowable range are not needed from a viewpoint of communication quality and power consumption. Hence, the controller 44A may exclude the reception characteristics outside the allowable range (for example, Z1, Z2, Z5, Z7, and Z8) from selection candidates.

Among the three candidates (Z3, Z4, and Z6), the combination of [X2, Y2] from which Z6 is obtained minimizes the power consumption. Hence, the controller 44A may select the combination of [X2, Y2]. Incidentally, the "power consumption" here may be a value where a margin with respect to the limit value is taken into consideration.

Then, the controller 44A may drive and control the LO light power adjuster 421A by the driving current "Yk" in the selected combination [Xj, Yk] (operation P15). In addition, the controller 44A may transmit and notify information indicating the driving current "Xj" in the selected combination [Xj, Yk] to the B-station (operation P16).

Incidentally, the order of operations P15 and P16 may be reversed. In addition, operations P15 and P16 may be performed in parallel with each other.

The controller 44B of the B-station may control the transmission light power adjuster 422B by the driving current "Xj" notified from the A-station (operation P17).

Thereafter, the controller 44A of the A-station may change the transmission light power a plurality of times by controlling the transmission light power adjuster 422A in the A-station. Then, the controller 44A may transmit power consumption information monitored by the power consumption monitor 441A at each time of changing the transmission light power to the partner B-station by the OSC, for example (operation P18).

At the B-station, for example, the controller 44B may change the LO light power a plurality of times by controlling the LO light power adjuster 421B in accordance with the changing of the transmission light power at the A-station. The controller 44B may store the following information $X_B$, $Y_B$, and $Z_B$ in the storage unit 443A at each time of changing the LO light power (operation P19).

$X_B$: Power consumption information of the A-station
$Y_B$: Power consumption information of the B-station
$Z_B$: Reception characteristic information of the B-station FIG. 14B illustrates an example of information stored in the storage unit 443B of the B-station. FIG. 14B represents, in a format similar to that of FIG. 14A, an example in which the A-station changes the transmission light power driving current four times to X1 to X4 [mA], and the B-station changes the LO light power driving current four times to Y1 to Y4 [mA].

Incidentally, the information of X1 to X4 [mA] in FIG. 14B is information transmitted from the A-station to the B-station in operation P18. In this case, the storage unit 443B of the B-station stores 16 different pieces of reception characteristic information $Z1_B$ to $Z16_B$. "$Z1_B$ to $Z16_B$" may be denoted as "Z1 to Z16" with "B" in "$Z1_B$ to $Z16_B$" omitted.

The controller 44B of the B-station may analyze the 16 different pieces of information as illustrated in FIG. 14B, and select a combination [Xj, Yk] of driving currents that minimize power consumption while satisfying a given reception characteristic from among the 16 different pieces of information (operation P20 in FIG. 13). A criterion for the selection may, for example, be similar to the criterion described in relation to the A-station with reference to FIG. 15 and FIG. 16.

Then, the controller 44B may drive and control the LO light power adjuster 421B by the driving current "Yk" in the selected combination [Xj, Yk] (operation P21 in FIG. 13). In addition, the controller 44B may transmit and notify information indicating the driving current "Xj" in the selected combination [Xj, Yk] to the A-station (operation P22). Incidentally, the order of operations P21 and P22 may be reversed. In addition, operations P21 and P22 may be performed in parallel with each other.

The controller 44A of the A-station may control the transmission light power adjuster 422A by the driving current "Xj" notified from the B-station (operation P23).

Incidentally, the operation example illustrated in FIG. 13 is an example in which the B-station first changes the transmission light power and the A-station determines conditions (for example, a ratio) for the transmission light power and the LO light power. However, the A-station may first change the transmission light power and the B-station may determine the conditions for the transmission light power and the LO light power.

For example, after power to the A-station and the B-station is turned on in operation P11, operations P18 to P23 in FIG. 13 may be performed first, and then operations P12 to P17 may be performed.

As described above, before a start of system operation, each of the A-station and the B-station changes the transmission light power driving current of the partner station and the LO light power driving current of the own station a plurality of times, and records information regarding the reception characteristic of the own station, the LO light power driving current of the own station, and the transmission light power driving current of the partner station at each time of the changes.

Then, each of the A-station and the B-station determines driving conditions for the transmission light power of the partner station and the LO light power of the own station based on the recorded information so as to satisfy a given reception characteristic and increase a margin with respect to the limit value of power consumption, and starts operation under the determined driving conditions.

Hence, each of the A-station and the B-station may start mutual optical communication in a state in which the given reception characteristic is satisfied and a total power consumption of the A-station and the B-station is optimized.

Incidentally, the driving conditions for the transmission light power and the LO light power may be different according to the "optical output power adjusting medium" used as the LO light power adjuster 421 and the transmission light power adjuster 422. When the "optical output power adjusting medium" is a medium that varies optical output power according to driving current such as an SOA, the driving current may be included in the driving conditions. When the "optical output power adjusting medium" is a medium that varies optical output power according to temperature, the temperature may be included in the driving conditions.

In addition, in a case where the optical transmission lines 3A and 3B are provided with an optical amplifier repeater in the configuration illustrated in FIG. 10 and FIG. 12, even when the A-station or the B-station changes the transmission light power, there is a possibility that the reception characteristic of the B-station or the A-station as the partner station is determined by the optical signal versus noise ratio (SN ratio) of the optical amplifier repeater depending on conditions, and therefore only a slight effect may be produced on the reception characteristic of the B-station or the A-station as the partner station.

For example, when the optical transmission lines 3A and 3B are provided with an optical amplifier repeater, the reception characteristic of the A-station or the B-station is correlated with the LO light power of the own station, and has no or little correlation with the transmission light power of the B-station or the A-station as the partner station.

Therefore, the present embodiment that is able to control the reception characteristic of the opposite station by dynamically adjusting transmission light power is useful for application to a data center interconnection (DCI) not provided with an optical amplifier repeater between the A-station and the B-station (for example, a transmission distance of 100 km or less).

In the case where the optical transmission lines 3A and 3B are provided with an optical amplifier repeater, the processing in which the B-station or the A-station changes the transmission light power a plurality of times in the flowchart of FIG. 13 may be omitted.

In addition, a procedure for determining the driving conditions before a start of system operation is not limited to the above-described example. For example, the above-described example corresponds to a determining procedure in which a plurality of driving conditions are tried before a start of system operation, and an optimum driving condition is selected from among the driving conditions (which determining procedure may be referred to as a "first determining procedure" for convenience).

On the other hand, a second determining procedure or a third determining procedure may be applied as the procedure for determining the driving conditions before a start of system operation.

In the second determining procedure, illustratively, an optimum driving condition may be obtained by performing arithmetic processing between the plurality of driving conditions tried in the first determining procedure. Cited an example of the arithmetic processing is arithmetic processing (for example, linear approximation) that performs supplementation between the plurality of driving conditions, for example, discrete data, because correlation between the reception characteristics and power consumptions of the opposite stations is known for each of the plurality of tried driving conditions. Thus, an optimum driving condition may be determined more precisely than by the first determining procedure.

The third determining procedure does not have to try a plurality of driving conditions. For example, one driving condition (for example, a combination of X1 and Y2) may be tried, and an optimum driving condition may be determined by arithmetic processing based on the value of a reception characteristic Z1 at the time of the driving condition.

For example, even when one driving condition is tried, an optimum driving condition may be determined by arithmetic processing such as linear approximation when correlation between the reception characteristics and power consumptions of the opposite stations is known in advance and information indicating the correlation is, for example, provided as a database in the A-station and the B-station.

After Start of System Operation

Figure 17:
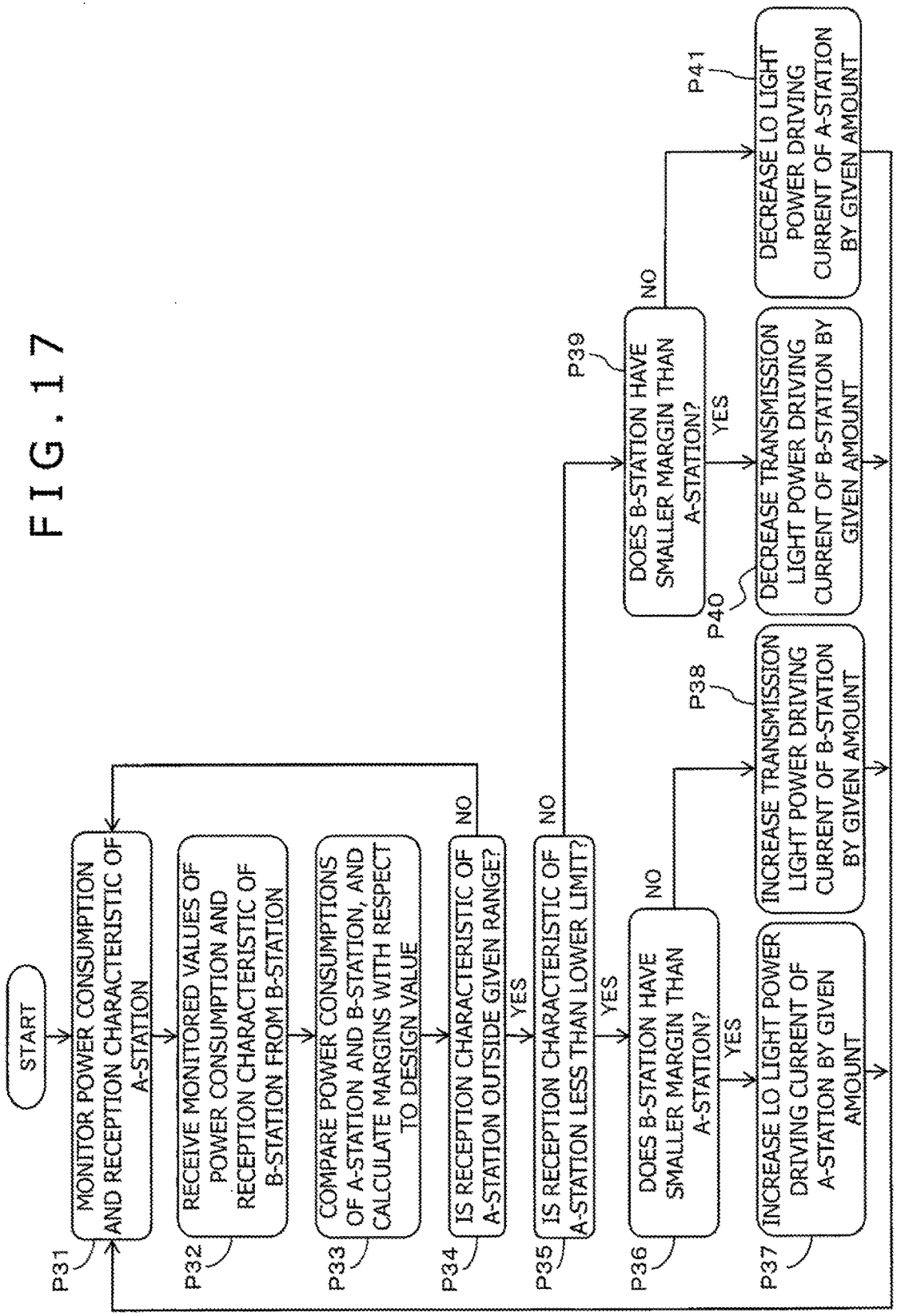
FIG. 17 is a flowchart illustrating an example of operation (after a start of operation) of an optical communication system illustrated in FIG. 10.

Next, referring to FIG. 17, description will be made of an example of control of the transmission light power and the LO light power between the A-station and the B-station, the control being performed after a start of operation of the optical communication system 1. FIG. 17 is a flowchart illustrating an example of operation (after a start of operation) of the optical communication system 1 illustrated in FIG. 10

As illustrated in FIG. 17, the controller 44A of the A-station may periodically or irregularly monitor the power consumption and the reception characteristic of the A-station by the power consumption monitor 441A and the reception characteristic monitor 442A after a start of system operation (operation P31).

As with the controller 44A of the A-station, the controller 44B of the B-station may periodically or irregularly monitor the power consumption and the reception characteristic of the B-station by the power consumption monitor 441B and the reception characteristic monitor 442B after the start of the system operation. The B-station may notify respective monitored values of the power consumption and the reception characteristic to the A-station by the OSC, for example.

When the controller 44A of the A-station receives the respective monitored values of the power consumption and the reception characteristic of the B-station from the B-station (operation P32), the controller 44A may compare the monitored value of the power consumption of the A-station and the monitored value of the power consumption of the B-station, and calculate margins with respect to a design value (operation P33).

Incidentally, the order of operation P31 and operation P32 may be reversed. Alternatively, operations P31 and P32 may be performed in parallel with each other.

After calculating the margins, the controller 44A may check whether or not the monitored value of the reception characteristic of the A-station is outside a given range (operation P34).

When the monitored value of the reception characteristic of the A-station is not outside the given range (NO in operation P34), the controller 44A may return to the processing from operation P31 on down.

When the monitored value of the reception characteristic of the A-station is outside the given range (YES in operation P34), the controller 44A may further check whether or not the monitored value of the reception characteristic of the A-station is less than a lower limit of the given range (operation P35).

When the monitored value of the reception characteristic of the A-station is less than the lower limit of the given range (YES in operation P35), the controller 44A may further check whether or not the B-station has a smaller margin with regard to power consumption, the margin being calculated in operation P33, than the A-station (operation P36).

When the B-station has a smaller margin than the A-station (YES in operation P36), the controller 44A may increase the LO light power driving current of the A-station by a given amount (operation P37). The controller 44A may then return to operation P31.

In a case of NO in operation P36, on the other hand, the controller 44A may transmit an instruction to increase the transmission light power driving current of the B-station by a given amount to the B-station by the OSC, for example (operation P38). The controller 44A may then return to operation P31. When the controller 44B of the B-station receives the increasing instruction, the controller 44B may increase the transmission light power driving current of the B-station by the given amount.

When the monitored value of the reception characteristic of the A-station is not less than the lower limit of the given range in operation P35 (NO), the controller 44A of the A-station may determine that the monitored value of the reception characteristic of the A-station exceeds an upper limit of the given range. For example, the controller 44A may determine that the reception characteristic of the A-station is in an excessively good state.

In response to the determination, as in operation P36, the controller 44A may further check whether or not the B-station has a smaller margin with regard to power consumption, the margin being calculated in operation P33, than the A-station (operation P39).

When the B-station has a smaller margin than the A-station (YES in operation P39), the controller 44A may transmit an instruction to decrease the transmission light power driving current of the B-station by a given amount to the B-station by the OSC, for example (operation P40). The controller 44A may then return to operation P31. When the controller 44B of the B-station receives the decreasing instruction, the controller 44B may decrease the transmission light power driving current of the B-station by the given amount.

In a case of NO in operation P39, on the other hand, the controller 44A of the A-station may decrease the LO light power driving current of the A-station by a given amount (operation P41). The controller 44A may then return to operation P31.

Incidentally, the B-station may also perform operations P31 to P41 as with the A-station. For operations P31 to P41 at the B-station, it suffices, for example, to read the "A-station" in FIG. 17 as the "B-station," and read the "B-station" in FIG. 17 as the "A-station."

Figures 18A, 18B:
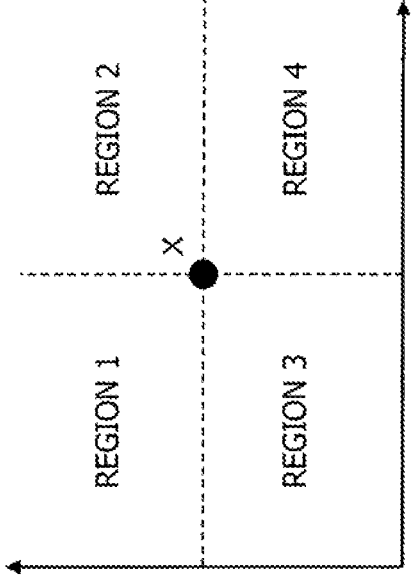
FIGS. 18A and 18B are diagrams of assistance in explaining an example of operation (after a start of operation) of an optical communication system illustrated in FIG. 10.

FIG. 18A and FIG. 18B are diagrams visually summarizing the processing of the flowchart illustrated in FIG. 17. FIG. 18A is a diagram in which an axis of abscissas indicates the reception characteristic of the A-station, an axis of ordinates indicates the reception characteristic of the B-station, and "X" denotes a target reception characteristic falling within the given range for both the A-station and the B-station. With the target reception characteristic X at a center, the reception characteristics of the A-station and the B-station may be divided into four regions 1 to 4.

In order to bring the reception characteristics of the A-station and the B-station closer to the target reception characteristic X, it suffices for the A-station and the B-station to control the transmission light power (driving current) and the LO light power (driving current) as in FIG. 18B according to which of the regions 1 to 4 the monitored reception characteristics belong to.

As described above, when the reception characteristic of the A-station (or the B-station) becomes less than the lower limit of the given range after a start of system operation, the A-station (or the B-station) performs control to increase the transmission light power driving current of one of the A-station and the B-station that has a larger margin with regard to power consumption.

When the reception characteristic of the A-station (or the B-station) exceeds the upper limit of the given range and is thus excessively good, on the other hand, the A-station (or the B-station) performs control to decrease the transmission light power driving current of one of the A-station and the B-station that has a smaller margin with regard to power consumption.

By such control, even when the reception characteristics of the A-station and the B-station vary depending on secular degradation of optical parts included in the A-station and the B-station and variances in transmission line loss, it is possible to compensate for the variance, and maintain the reception characteristics of the A-station and the B-station within the given range.

Incidentally, when the reception characteristic of the A-station becomes less than the lower limit of the given range after the start of the system operation (for example, YES in operation P35 in FIG. 17), the controller 44A may increase the LO light power driving current of the A-station until the reception characteristic of the A-station becomes equal to or more than the lower limit of the given range.

For example, the controller 44A may determine that an emergency situation has occurred, and immediately increase the LO light power driving current of the A-station until the reception characteristic of the A-station becomes equal to or more than the lower limit of the given range, rather than by the given amount, in operation P37 in FIG. 17. The controller 44A may then return to operation P31. Also when the reception characteristic of the B-station becomes less than the lower limit of the given range, it suffices for the controller 44B to operate similarly.

It is thereby possible to minimize a time during which communication is interrupted because the reception characteristic(s) of one or both the A-station and the B-station become(s) less than the lower limit of the given range.

As described above, according to the above-described control of the transmission light power and the LO light power between the A-station and the B-station, it is possible to compensate for the following variances and variations (1) to (4) that may occur when the A-station and the B-station control the transmission light power and the LO light power independently of each other.

(1) Loss variances due to manufacturing variations in the optical modulator 14 and variations in amplitude of driving signals
(2) Difference between light transmission and reception characteristics of optical transceivers 10 in a case where transmission and reception are performed between the optical transceivers 10 manufactured by different vendors
(3) Individual variations in reception band and noise characteristics of the optical receivers 21
(4) Variances in respective transmission conditions for up (upstream) transmission and down (downstream) transmission (variances in loss of the optical transmission lines, an increase in distance, obstacle transfer, and the like)

Hence, it is possible to relax specifications desired for key devices (the optical modulator 14, the driver amplifiers 15, the light source 12, the optical receiver 21, and the like) of the A-station and the B-station. An improvement in yield of the key devices may be expected as a result of the relaxation of the specifications. It is thus possible to achieve reductions in cost of the key devices and improvements in ease of procurement of the key devices from multiple vendors.

Others

Incidentally, as already described, apart from the transmission distance, a maximum value of the transmission light power of the optical transceiver 10 is limited because a nonlinear effect occurs when the optical power input to the optical transmission line is too high.

For example, when the level of light input to the optical transmission line exceeds a maximum value (for example, 0 dBm/ch), the nonlinear effect makes it difficult to improve the reception characteristic of the opposite station directly, even if light having a power level higher than the maximum value is input to the transmission line. For example, the input of light having an especially high power level to the optical transmission line does not improve the reception characteristic of the opposite station, and thus tends to be useless.

Therefore, in the foregoing embodiment, the transmission light power of the optical transceiver 10 may be controlled based on a transmission light power limit based on the nonlinear effect in addition to the power consumption limit of the SOA.

For example, of the transmission light power and the LO light power, the transmission light power may reach the limit based on the nonlinear effect before reaching the SOA power consumption limit. For example, in addition to the SOA power consumption limit, the limitation of the optical power input to the optical transmission line based on the nonlinear effect are imposed on the transmission light power.

Accordingly, for example, one of the A-station and the B-station (for example, the controllers 44A and 44B) may improve the reception characteristic in the other station (opposite station) by increasing the LO light power in the opposite station when detecting one of these two kinds of limits.

Therefore, the controllers 44A and 44B of the A-station and the B-station may transmit information to each other (play catch), and improve the reception characteristic in a receiving station efficiently by increasing the LO light power in the station having a larger margin.

Hence, the information mutually transmitted by the A-station and the B-station may include information regarding the limitation of optical power input to the optical transmission lines based on the nonlinear effect in addition to information regarding power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. An optical transmission device in an optical communication system in which a first optical transmission device and a second optical transmission device are capable of mutual bidirectional optical communication, the optical transmission device as the first optical transmission device comprising:
   a light source configured to output light;
   an optical transmitter configured to transmit first information regarding a reception characteristic and power consumption of the first optical transmission device to the second transmission device;
   an optical receiver configured to receive second information regarding a reception characteristic and power consumption of the second optical transmission device from the second transmission device;
   an optical branching circuit configured to branch the light output from the light source into transmission light for the optical transmitter and local light for coherent reception by the optical receiver, and vary power of the transmission light and power of the local light individually;

a memory; and a processor coupled to the memory, the processor configured to control a driving condition of the optical branching circuit, based on the first information and the second information, the power of the transmission light and the power of the local light varying in accordance with the driving condition.

2. The optical transmission device according to claim 1, wherein, before a start of operation of the first optical transmission device and the second optical transmission device, the processor controls the driving condition to change the power of the transmission light and the power of the local light individually, controls the optical transmitter to transmit the first information, and determines the driving condition based on the first information and the second information in case of changing the power of the transmission light and the power of the local light individually.

3. The optical transmission device according to claim 2, wherein the processor determines the driving condition so as to increase a margin with respect to a limit of the power consumption of the first optical transmission device.

4. The optical transmission device according to claim 2, wherein, after the start of the operation of the first optical transmission device and the second optical transmission device, the processor controls the driving condition so as to increase the power of the transmission light when the reception characteristic of the first optical transmission device is less than a specific reception characteristic.

5. The optical transmission device according to claim 2, wherein, after the start of the operation of the first optical transmission device and the second optical transmission device, the processor controls the optical transmitter to transmit the first information so as to increase the power of the transmission light of the second optical transmission device when the reception characteristic of the first optical transmission device is less than a specific reception characteristic.

6. The optical transmission device according to claim 2, wherein, after the start of the operation of the first optical transmission device and the second optical transmission device, the processor controls the driving condition so as to decrease the power of the transmission light when the reception characteristic of the first optical transmission device exceeds a specific reception characteristic.

7. The optical transmission device according to claim 2, wherein, after the start of the operation of the first optical transmission device and the second optical transmission device, the processor controls the optical transmitter to transmit the first information so as to decrease the power of the transmission light of the second optical transmission device when the reception characteristic of the first optical transmission device exceeds a specific reception characteristic.

8. The optical transmission device according to claim 2, wherein, after the start of the operation of the first optical transmission device and the second optical transmission device, the processor controls the driving condition so as to increase the power of the transmission light when the reception characteristic of the first optical transmission device is less than a specific reception characteristic, when the reception characteristic of the first station is less than the specific reception characteristic, subsequently controls the driving condition so as to increase the power of the transmission light, and when the reception characteristic of the first station exceeds the specific reception characteristic, subsequently controls the driving condition so as to decrease the power of the transmission light.

9. The optical transmission device according to claim 2, wherein, after the start of the operation of the first optical transmission device and the second optical transmission device, the processor controls the driving condition so as to increase the power of the transmission light when the reception characteristic of the first optical transmission device is less than a specific reception characteristic, when the reception characteristic of the first station is less than the specific reception characteristic, subsequently controls the optical transmitter to transmit the first information so as to increase the power of the transmission light of the second optical transmission device, and when the reception characteristic of the first station exceeds the specific reception characteristic, subsequently controls the optical transmitter to transmit the first information so as to decrease the power of the transmission light of the second optical transmission device.

10. The optical transmission device according to claim 1, wherein the optical branching circuit includes a splitter configured to branch the light output from the light source into two pieces of light, a semiconductor optical amplifier arranged on at least one of optical paths of the two pieces of light, and an isolator arranged at an output side of the semiconductor optical amplifier, and wherein the processor controls the driving condition of the optical branching circuit by controlling a driving current of the semiconductor optical amplifier.

11. The optical transmission device according to claim 1, wherein the optical branching circuit includes a splitter configured to branch the light output from the light source into two pieces of light, an input lens to which the two pieces of light branched by the splitter are input, a semiconductor optical amplifier arranged on at least one of optical paths of the two pieces of light propagating from the splitter to the input lens, a polarization-dependent type optical isolator to which the two pieces of light output from the input lens are input, and an output lens to which the two pieces of light output from the optical isolator are input, and wherein the processor controls the driving condition of the optical branching circuit by controlling a driving current of the semiconductor optical amplifier.

12. The optical transmission device according to claim 11, wherein the input lens and the output lens are arranged such that the two pieces of light are incident on different positions off a center of each of the input lens and the output lens, and wherein the optical isolator is arranged at a position where the two pieces of light intersect each other within the optical isolator.

13. The optical transmission device according to claim 12, wherein each of the input lens and the output lens is an aspherical lens.

14. The optical transmission device according to claim 1, wherein the optical branching circuit includes
- a splitter configured to branch the light output from the light source into two pieces of light,
- a semiconductor optical amplifier arranged on at least one of optical paths of the two pieces of light,
- an isolator arranged at an output side of the semiconductor optical amplifier and to which the two pieces of light are input, and
- an optical fiber array configured to propagate the two pieces of light output from the isolator to the optical transmitter and the optical receiver, respectively, and
wherein the processor controls the driving condition of the optical branching circuit by controlling a driving current of the semiconductor optical amplifier.

15. An optical communication system comprising:
a first optical transmission device; and
a second optical transmission device,
wherein the first optical transmission device and the second optical transmission device are capable of mutual bidirectional optical communication each other,
wherein the first optical transmission device is configured to
a first light source configured to output light,
a first optical transmitter configured to transmit first information regarding a reception characteristic and power consumption of the first optical transmission device to the second optical transmission device,
a first optical receiver configured to receive second information regarding a reception characteristic and power consumption of the second optical transmission device from the second transmission device;
a first optical branching circuit configured to branch the light output from the first light source into first transmission light for the first optical transmitter and first local light for coherent reception by the first optical receiver, and vary power of the first transmission light and power of the first local light individually,
a first memory, and
a first processor coupled to the first memory, the first processor configured to control a first driving condition of the first optical branching circuit, based on the first information and the second information, the power of the first transmission light and the power of the first local light varying in accordance with the first driving condition, and
wherein the second optical transmission device is configured to
a second light source configured to output light,
a second optical transmitter configured to transmit second information regarding a reception characteristic and power consumption of the second optical transmission device to the first optical transmission device,
a second optical receiver configured to receive first information regarding a reception characteristic and power consumption of the first optical transmission device from the first transmission device;
a second optical branching circuit configured to branch the light output from the second light source into second transmission light for the second optical transmitter and second local light for coherent reception by the second optical receiver, and vary power of the second transmission light and power of the second local light individually,
a second memory, and
a second processor coupled to the second memory, the second processor configured to control a second driving condition of the second optical branching circuit, based on the first information and the second information, the power of the second transmission light and the power of the second local light varying in accordance with the second driving condition.

* * * * *